United States Patent
Shimizu et al.

(10) Patent No.: US 11,748,809 B2
(45) Date of Patent: Sep. 5, 2023

(54) COMPUTER-READABLE RECORDING MEDIUM STORING TRADING PROGRAM, TRADING METHOD AND TRADING DEVICE

(71) Applicant: FUJITSU LIMITED, Kawasaki (JP)

(72) Inventors: Toshihiro Shimizu, Kawasaki (JP); Akihito Nakamura, Shinagawa (JP); Motohiro Kosaki, Kawasaki (JP); Akihiro Kuwabara, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 17/409,907

(22) Filed: Aug. 24, 2021

(65) Prior Publication Data

US 2021/0383474 A1 Dec. 9, 2021

Related U.S. Application Data

(63) Continuation of application No. PCT/JP2019/009190, filed on Mar. 7, 2019.

(51) Int. Cl.
*G06Q 40/04* (2012.01)

(52) U.S. Cl.
CPC .................. *G06Q 40/04* (2013.01)

(58) Field of Classification Search
CPC .................................................. G06Q 40/04
See application file for complete search history.

(56) References Cited

U.S. PATENT DOCUMENTS

| 2003/0093291 A1 | 5/2003 | Dojo et al. | |
| 2009/0132412 A1* | 5/2009 | Cleary Neubert | G06Q 40/00 705/37 |
| 2015/0356677 A1* | 12/2015 | Chapman | G06Q 40/04 705/37 |

FOREIGN PATENT DOCUMENTS

| JP | H10-320494 A | 12/1998 | |
| WO | WO-0026834 A2 * | 5/2000 | G06Q 40/04 |
| WO | 2001/075721 A1 | 10/2001 | |
| WO | WO-02052369 A2 * | 7/2002 | G06Q 40/04 |

OTHER PUBLICATIONS

Dreamscape: What's A Market Depth Chart? Nov. 9, 2018, pp. 1-11 (Year: 2011).*
Fung, Stanley P. Y.: Optimal Online Two-Way Trading with Bounded Number of Transactions, Dec. 11, 2018, SpringerLink, pp. 1-45. (Year: 2018).*

(Continued)

*Primary Examiner* — Bijendra K Shrestha
(74) *Attorney, Agent, or Firm* — Fujitsu Patent Center

(57) ABSTRACT

A non-transitory computer-readable recording medium stores a trading program for causing a computer to execute a process including: acquiring a number of sell orders for each of sell limits and a number of buy orders for each of buy limits; executing one of pairings of one of the sell orders and one of the buy orders in which one of the sell limits of the one of the sell orders is equal to or lower than one of the buy limits of the one of the buy orders, among the pairings of the sell orders and the buy orders, based on the acquired number of the sell orders for each of the sell limits and the acquired number of the buy orders for each of the buy limits; and resolving an execution price for each of executions.

7 Claims, 26 Drawing Sheets

(56) References Cited

OTHER PUBLICATIONS

Perlin, M.; M of a Kind: A Multivariate Approach at Pairs Trading, Dec. 1, 2007, Munich Personal RePEc Archive (MPRA), pp. 1-26. (Year: 2007).*
Delaney et al.: The Dampening Effect of Iceberg Orders on Small Trader's Welfare, Aug. 10, 2017, SpringerLink, pp. 1-69. (Year: 2017).*
International Search Report and Written Opinion of the International Searching Authority (Form PCT/ISA/210, 220 and 237), mailed in connection with PCT/JP2019/009190 and dated May 28, 2019 (Total 13 pages).
JPOA—Office Action of Japanese Patent Application No. 2021-503380 dated Jul. 5, 2022 with English Machine translation.

* cited by examiner

FIG. 1

| SELL | PRICE | BUY |
|---|---|---|
|  | 104 | 1 |
|  | 103 |  |
| 4 | 102 |  |
| 1 | 101 | 2 |
|  | 100 |  |
|  | 99 |  |
|  | 98 | 5 |

1. FOUR SELLS AT 98 YEN AND FOUR BUYS AT 98 YEN
2. FIVE SELLS AT 99 YEN AND FIVE BUYS AT 100 YEN
3. THREE SELLS AT 100 YEN AND THREE BUYS AT 102 YEN
4. THREE SELLS AT 103 YEN AND THREE BUYS AT 104 YEN

TOTAL OF 15 EXECUTIONS

| SELL | PRICE | BUY |
|---|---|---|
|  | 104 | 4 |
| 3 | 103 |  |
| 4 | 102 | 3 |
| 1 | 101 | 2 |
| 3 | 100 | 5 |
| 5 | 99 |  |
| 4 | 98 | 9 |

FIG. 2

| SELL | PRICE | BUY |
|---|---|---|
|  | 104 | 4 |
| 3 | 103 |  |
| 4 | 102 | 3 |
| 1 | 101 | 2 |
| 3 | 100 | 5 |
| 5 | 99 |  |
| 4 | 98 | 9 |

WHEN PRESENT PRICE IS 100 YEN

1. FOUR SELLS AT 98 YEN AND FOUR BUYS AT 98 YEN: 98 YEN
2. FIVE SELLS AT 99 YEN AND FIVE BUYS AT 100 YEN: 100 YEN
3. THREE SELLS AT 100 YEN AND THREE BUYS AT 102 YEN: 100 YEN
4. THREE SELLS AT 103 YEN AND THREE BUYS AT 104 YEN: 103 YEN

FIG. 3

| SELL | PRICE | BUY |
|---|---|---|
|  | 104 | 4 |
| 3 | 103 |  |
| 4 | 102 | 3 |
| 1 | 101 | 2 |
| 3 | 100 | 5 |
| 5 | 99 |  |
| 4 | 98 | 9 |

WHEN PRESENT PRICE IS 100 YEN

1. FOUR SELLS AT 98 YEN AND FOUR BUYS AT 98 YEN: 98 YEN
2. FIVE SELLS AT 99 YEN AND FIVE BUYS AT 100 YEN: 100 YEN
3. THREE SELLS AT 100 YEN AND THREE BUYS AT 102 YEN: 100 YEN
3. THREE SELLS AT 100 YEN AND THREE BUYS AT 102 YEN: 100 YEN

STOCK PRICE IS $$\frac{98 \times 4 + 100 \times 5 + 100 \times 3 + 103 \times 3}{15} \fallingdotseq 100.07 \text{YEN}$$

FIG. 4

(a) CERTAIN MATCHING → (b) SHIFTED MATCHING

FIG. 12

| SELL | PRICE | BUY |
|------|-------|-----|
|      | 104   | 4   |
| 3    | 103   |     |
| 4    | 102   | 3   |
| 1    | 101   | 2   |
| 3    | 100   | 5   |
| 5    | 99    |     |
| 4    | 98    | 9   |

FIG. 14

| SELL | PRICE | BUY |
|------|-------|-----|
|      | 104   | 4   |
| 3    | 103   |     |
| 4    | 102   | 3   |
| 1    | 101   | 2   |
| 3    | 100   | 5   |
| 5    | 99    |     |
| 4    | 98    | 9   |

FIG. 18

| SELL | PRICE | BUY |
|---|---|---|
|  | 104 | 4 |
| 3 | 103 |  |
| 4 | 102 | 3 |
| 1 | 101 | 2 |
| 3 | 100 | 5 |
| 5 | 99 |  |
| 4 | 98 | 9 |

⇑

| SELL | PRICE | BUY |
|---|---|---|
|  | 104 | 4 |
| 3 | 103 |  |
| 4 | 102 | 3 |
| 1 | 101 | 2 |
| 3 | 100 | 5 |
| 5 | 99 |  |
| 4 | 98 | 9 |

+

| SELL | PRICE | BUY |
|---|---|---|
|  | 104 | 4 |
| 3 | 103 |  |
| 4 | 102 | 3 |
| 1 | 101 | 2 |
| 3 | 100 | 5 |
| 5 | 99 |  |
| 4 | 98 | 9 |

FIG. 23

| SELL | PRICE | BUY |
|------|-------|-----|
|      | 104   | 4   |
| 3    | 103   |     |
| 4    | 102   | 3   |
| 1    | 101   | 2   |
|      | 100   | 5   |
| 5    | 99    |     |
| 4    | 98    | 9   |

COMPUTER-READABLE RECORDING MEDIUM STORING TRADING PROGRAM, TRADING METHOD AND TRADING DEVICE

CROSS-REFERENCE TO RELATED APPLICATION

This application is a continuation application of International Application PCT/JP2019/009190 filed on Mar. 7, 2019 and designated the U.S., the entire contents of which are incorporated herein by reference.

FIELD

The embodiments discussed herein are related to a trading program, a trading method, and a trading device.

BACKGROUND

In the trading of stocks or the like, Itayose and Zaraba are employed. Itayose is a trade in which orders from the time the orders are accepted to the start of transactions are put together, and the opening price is resolved by establishing the transactions. Zaraba is a trade in which a transaction is established between an already placed order and a newly placed order, or between newly placed orders.

Japanese National Republication of International Patent Application No. WO 2001/075721 and Japanese Laid-open Patent Publication No. 10-320494 are disclosed as related art.

In trading illustrated in FIG. 24, sell orders higher than the present price, buy orders lower than the present price, and either the sell order at the present price or the buy order at the present price are put on hold without being settled. There is thus a problem that the orders put on hold remain on the depth of market table and the number of executions is small.

One aspect of the present embodiment aims to increase the number of executions in trading.

SUMMARY

According to an aspect of the embodiments, a non-transitory computer-readable recording medium stores a trading program for causing a computer to execute a process including: acquiring a number of sell orders for each of sell limits and a number of buy orders for each of buy limits; executing one of pairings of one of the sell orders and one of the buy orders in which one of the sell limits of the one of the sell orders is equal to or lower than one of the buy limits of the one of the buy orders, among the pairings of the sell orders and the buy orders, based on the acquired number of the sell orders for each of the sell limits and the acquired number of the buy orders for each of the buy limits; and resolving an execution price for each of executions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of Itayose by an execution device according to a first embodiment;

FIG. 2 is a diagram illustrating an example of setting execution prices of the executions illustrated in FIG. 1;

FIG. 3 is a diagram illustrating an example of setting a stock price subsequent to the executions illustrated in FIG. 1;

FIG. 4 is a diagram illustrating how to shift matches;

FIG. 12 is a diagram illustrating an example of matching by a first matching method;

FIG. 14 is a diagram illustrating an example of executions by a second matching method;

FIG. 18 is a diagram illustrating an example of a mating rule;

FIG. 23 is a diagram illustrating an example of depth of market information in stock trading.

DESCRIPTION OF EMBODIMENTS

For the trade, depth of market information that indicates the sell limits of sell orders and the number of sell orders and the buy limits of buy orders and the number of buy orders is used. FIG. 23 is a diagram illustrating an example of the depth of market information in stock trading. In FIG. 23, the middle column indicates the value of the limit price, the left column indicates the number of shares of sell orders relevant to the price, and the right column indicates the number of shares of buy orders relevant to the price. Here, one share denotes the unit number of stocks. For example, the number of shares of sell orders with a sell limit of 102 yen is four, and the number of shares of buy orders with a buy limit of 102 yen is three.

In stock trading, an execution device executes the sell orders and the buy orders sequentially in the order from the lowest for sell orders and in the order from the highest for buy orders. Then, the execution device stops the execution at a point where the sell order and the buy order have the same price and designates the price at that time as the present price. Thereafter, all the executed trades are equally performed at the present price.

Figure 24:
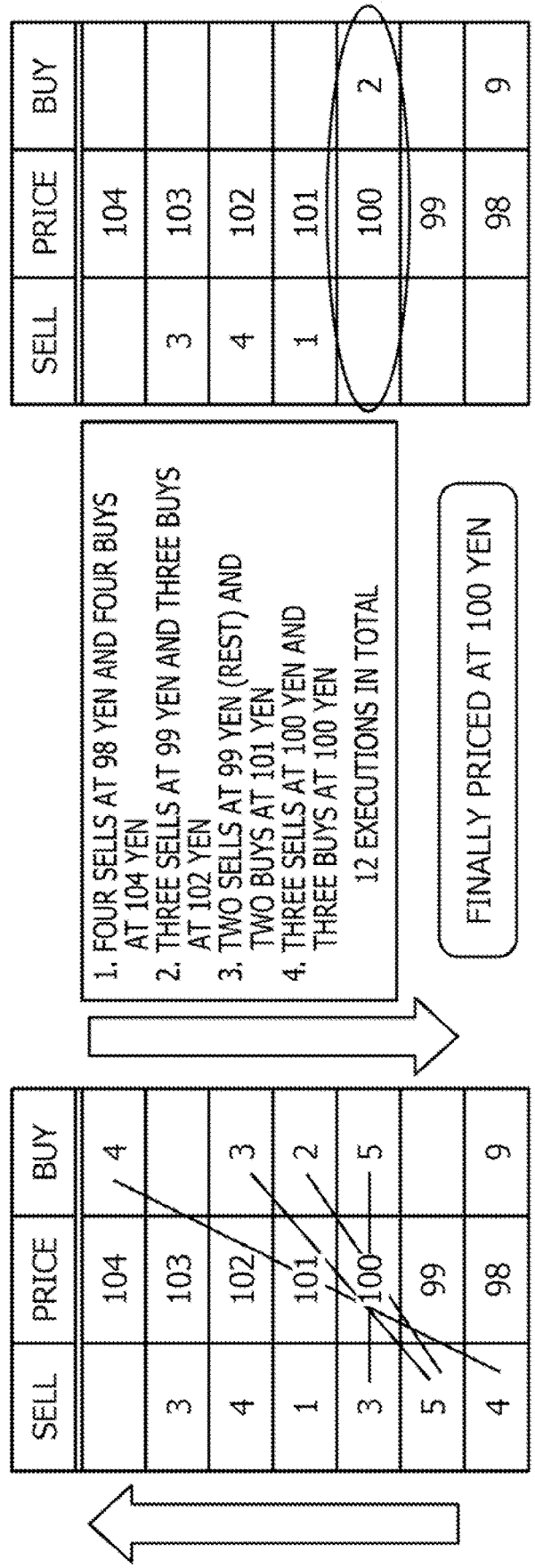
FIG. 24 is a diagram for explaining Itayose stock trading.

FIG. 24 is a diagram for explaining stock trading. As illustrated in FIG. 24, the execution device first executes four sells of 98 yen and four buys of 104 yen. Next, the execution device executes three sells of 99 yen and three buys of 102 yen. Next, the execution device executes two sells of 99 yen and two buys of 101 yen. Then, the execution device executes three sells of 100 yen and three buys of 100 yen and ends the execution. In this case, the execution device executes a total of 12 deals at 100 yen and designates the present price as 100 yen.

Note that, as prior art, there is a trading support facility that supports trading of each of a plurality of products or services between a provider who wants to make a provision and a consumer who wants to make a purchase. This trading support facility includes a matching part and a processing part. The matching part matches a provider who has offered a providing price and a consumer who has offered a purchase price for each product or service even when the providing price offered by the provider and the purchase price offered by the consumer do not coincide with each other. The processing part performs processing for establishing a trade between the matched consumer and provider at a price that meets these offered prices.

Furthermore, as prior art, there is a central market system capable of implementing an effective electronic market that enables smooth operation and is capable of flexibly handling the wishes of participants. This central market system accepts transaction application information containing at least data indicating the distinction between buying and selling and data indicating the price, from a market client system. Then, this central market system stores the accepted transaction application information to perform processing of establishing a trade by collating the stored data relating to purchase with the stored data relating to sales, and notifies at least a market client system relating to the contracted transaction application information of information regarding the contract.

In trading illustrated in FIG. 24, sell orders higher than the present price, buy orders lower than the present price, and either the sell order at the present price or the buy order at the present price are put on hold without being settled. There is thus a problem that the orders put on hold remain on the depth of market table and the number of executions is small.

One aspect of the present embodiment aims to increase the number of executions in trading.

Hereinafter, embodiments will be described of a trading program, a trading method, and a trading device disclosed in the present application in detail with reference to the drawings. Note that the embodiments do not limit the technology disclosed.

First Embodiment

FIG. 1 is a diagram illustrating an example of trading by an execution device according to a first embodiment. As illustrated in FIG. 1, the execution device according to the first embodiment executes a total of 15 deals made up of four sells at 98 yen and four buys at 98 yen, five sells at 99 yen and five buys at 100 yen, and three sells at 100 yen and three buys at 102 yen, and three sells at 103 yen and three buys at 104 yen. Compared with the case illustrate in FIG. 24, a trading approach using the execution device according to the first embodiment increases the number of executions by three.

In this manner, in the trading by the execution device according to the first embodiment, since a degree of freedom is produced in which sell order and which buy order are to be executed, it becomes possible to select an execution approach such as maximizing the number of executions or minimizing the execution price gap. Furthermore, in the trading by the execution device according to the first embodiment, the execution price can be set to any value equal to or higher than the sell limit but equal to or lower than the buy limit. For example, assuming that the sell limit is s yen, the buy limit is b (s≤b) yen, and the present price is p yen, the execution device according to the first embodiment designates the execution price also as p yen if p is contained in the interval [s, b], and designates the execution price as a value closest to p yen if p is not contained in the interval [s, b]. For example, in the execution device according to the first embodiment, if p<s holds, the execution price is designated as s yen, and if b<p holds, the execution price is designated as b yen.

FIG. 2 is a diagram illustrating an example of setting the execution prices of the executions illustrated in FIG. 1. As illustrated in FIG. 2, the execution price of four sells at 98 yen and four buys at 98 yen is 98 yen because s=98 and b=98<p=100 hold, and the execution price of five sells at 99 yen and five buys at 100 yen is 100 yen because s=99 and b=100=p hold. Furthermore, the execution price of three sells at 100 yen and three buys at 102 yen is 100 yen because s=100=p and b=102 hold, and the execution price of three sells at 103 yen and three buys at 104 yen is 103 yen because p<s=103 and b=104 hold.

In addition, the execution device according to the first embodiment designates an average value of all the execution prices as the subsequent stock price. FIG. 3 is a diagram illustrating an example of setting a stock price subsequent to the executions illustrated in FIG. 1. As illustrated in FIG. 3, the subsequent stock price is (98×4+100×5+100×3+103×3)/15≈100.07 yen.

Next, matching of sell orders and buy orders in the Zaraba will be described. Assuming that the present price is p yen, the execution device according to the first embodiment merges a new sell order higher than p yen and a new buy order at p yen or lower with existing orders and treats the new orders as existing orders.

Then, for a new sell order at p yen or lower, the execution device according to the first embodiment shifts the new sell order to a lower one and shifts an existing buy order to a lowest one equal to or higher than each sell order amount to perform matching, thereby specifying the maximum number of executions for the new sell orders at p yen or lower. Furthermore, for a new buy order higher than p yen, the execution device according to the first embodiment shifts the new buy order to a higher one and shifts an existing sell order to a highest one equal to or lower than each buy order amount to perform matching, thereby specifying the maximum number of executions for the new buy orders higher than p yen.

Figure 4:
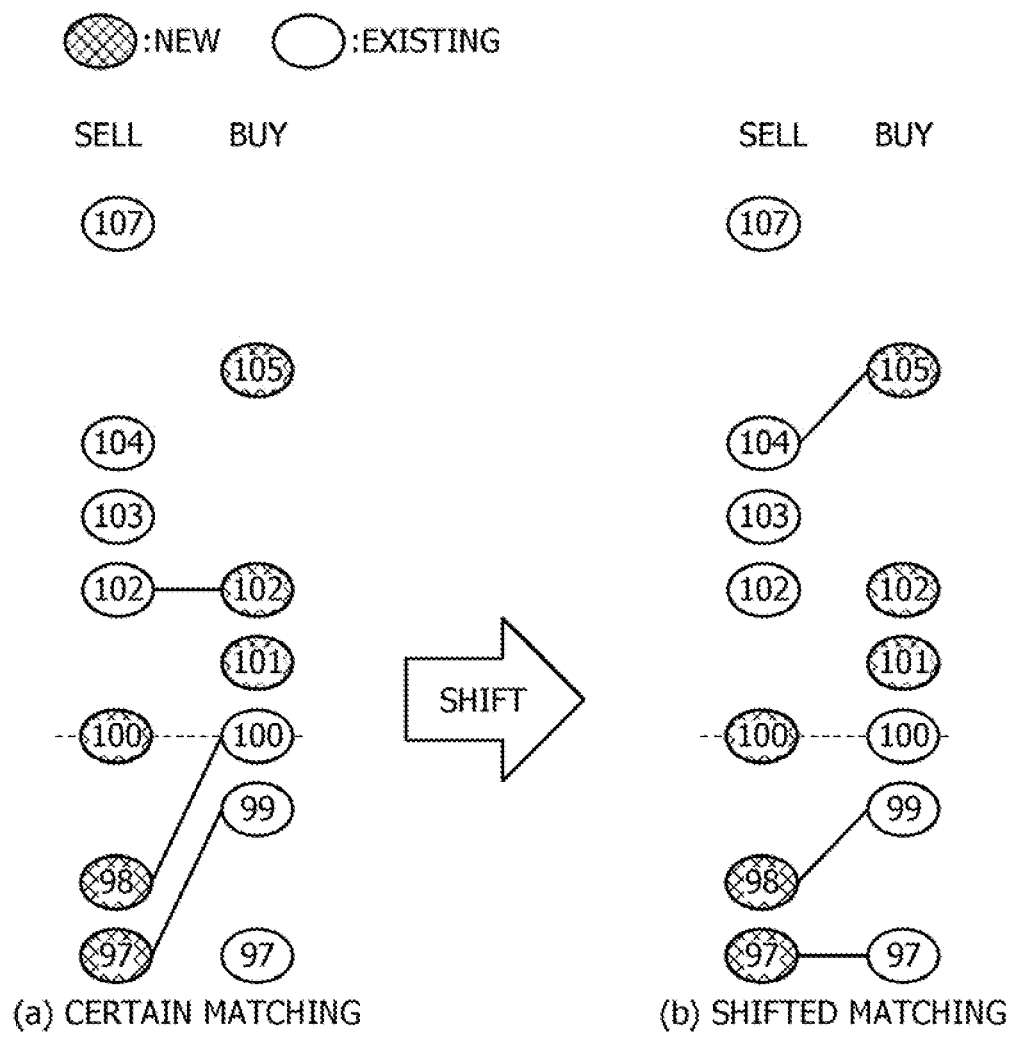

FIG. 4 is a diagram illustrating how to shift matches. In FIG. 4, the numbers enclosed by unshaded ellipses indicate the limit prices of existing orders, and the numbers enclosed by shaded ellipses indicate the limit prices of new orders. Furthermore, the present price is 100 yen. In FIG. 4, (a) illustrates certain matching of existing orders and new orders, and (b) of FIG. 4 illustrates matching obtained by shifting the matching in (a) of FIG. 4.

As illustrated in (a) of FIG. 4, in the certain matching, a new sell at 97 yen and an existing buy at 99 yen are matched, a new sell at 98 yen and an existing buy at 100 yen are matched, and a new buy at 102 yen and an existing sell at 102 yen are matched.

The execution device according to the first embodiment matches these three deals by shifting as illustrated in (b) of FIG. 4. For a match between a new sell order at 100 yen or lower and an existing buy order, the execution device according to the first embodiment matches a sell at 97 yen obtained by shifting the new sell at 97 yen to a lower one and a buy at 97 yen obtained by shifting the existing buy at 99 yen to a lowest one equal to or higher than the sell order amount. Similarly, the execution device according to the first embodiment matches a sell at 98 yen obtained by shifting the new sell at 98 yen to a lower one and a buy at 99 yen obtained by shifting the existing buy at 100 yen to a lowest one equal to or higher than the sell order amount.

Furthermore, for a match of a new buy order higher than 100 yen, the execution device according to the first embodiment matches a buy at 105 yen obtained by shifting the new buy at 102 yen to a higher one and a sell at 104 yen obtained by shifting the existing sell at 102 yen to a highest one equal to or lower than the buy order amount.

Figure 5:
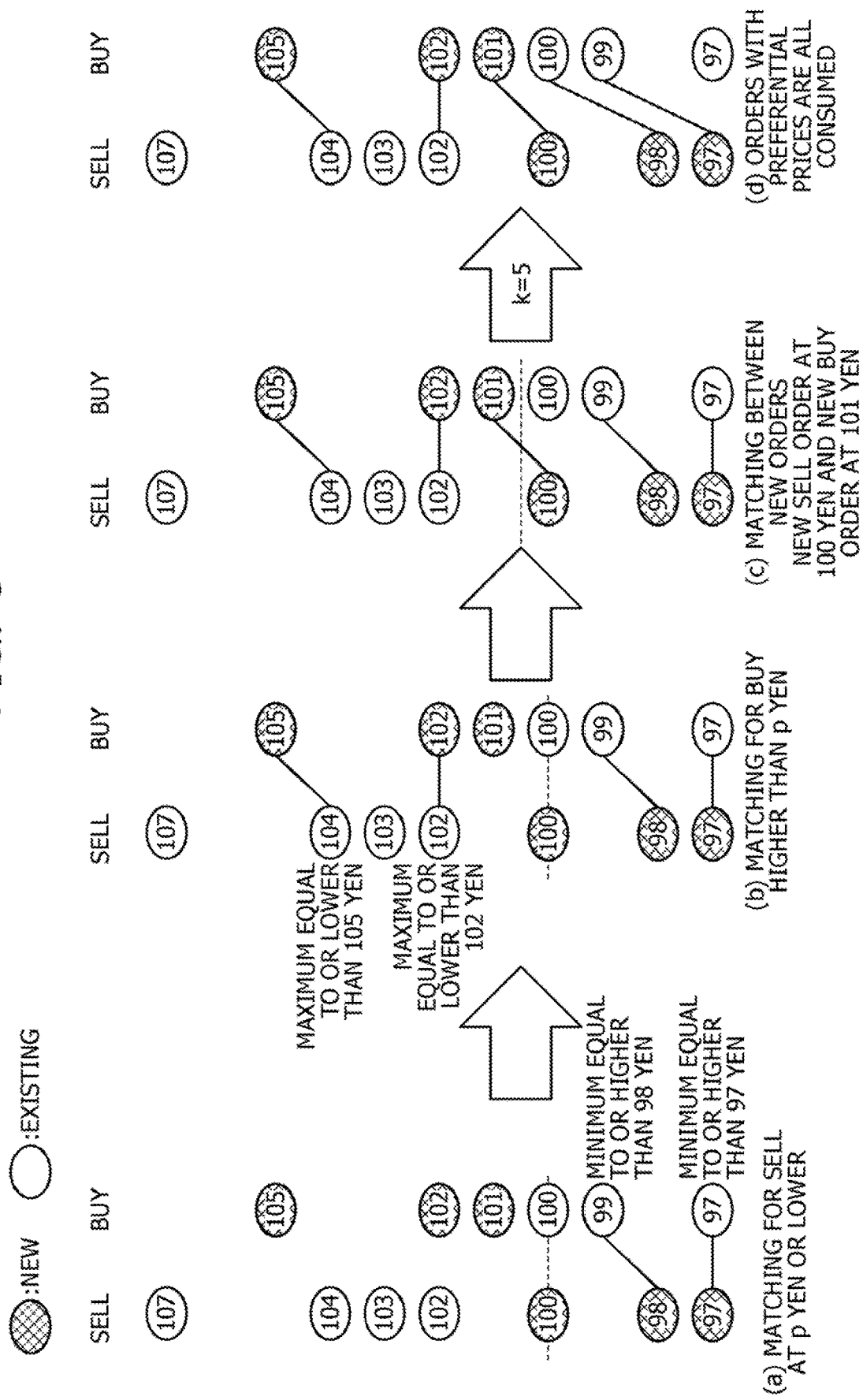
FIG. 5 is a diagram for explaining a matching algorithm by the execution device according to the first embodiment.

FIG. 5 is a diagram for explaining a matching algorithm by the execution device according to the first embodiment. As illustrated in (a) of FIG. 5, the execution device according to the first embodiment specifies the maximum number of executions as two by performing the shifts illustrated in FIG. 4 for new sell orders at p yen or lower. In order to perform the shifts, the execution device according to the first embodiment specifies a minimum existing buy equal to or higher than 97 yen to match with the new sell at 97 yen, and specifies a minimum existing buy equal to or higher than 98 yen to match with the new sell at 98 yen.

In this manner, for a new sell order at p yen or lower, the execution device according to the first embodiment shifts the new sell order to a lower one and shifts an existing buy order to a lowest one equal to or higher than each sell order amount to perform matching. Therefore, the execution device according to the first embodiment may limit the matching search space and specify the maximum number of executions at high speed for a new sell order at p yen or lower.

Then, as illustrated in (b) of FIG. 5, the execution device according to the first embodiment specifies the maximum number of executions as two by performing the shifts illustrated in FIG. 4 for a new buy order higher than p yen. Note that, while FIG. 4 illustrates only the match between the new buy at 105 yen and the existing sell at 104 yen in order to explain the shift, (b) of FIG. 5 illustrates matching with the maximum number of executions. In order to perform the shifts, the execution device according to the first embodiment specifies a maximum existing sell equal to or lower than 105 yen to match with a new buy at 105 yen, and specifies a maximum existing sell equal to or lower than 102 yen to match with a new buy at 102 yen.

In this manner, for a new buy order higher than p yen, the execution device according to the first embodiment shifts the new buy order to a higher one and shifts an existing sell order to a highest one equal to or lower than each buy order amount to perform matching. Therefore, the execution device according to the first embodiment may limit the matching search space and specify the maximum number of executions at high speed for a new buy order higher than at p yen.

Then, as illustrated in (c) of FIG. 5, the execution device according to the first embodiment matches a remaining new sell order and a remaining new buy order and specifies the maximum number of executions between the new orders as one.

Thereafter, the execution device according to the first embodiment specifies the maximum number of executions k as a whole as five by totaling the maximum numbers of executions in (a) to (c) of FIG. 5. Additionally, as illustrated in (d) of FIG. 5, the execution device according to the first embodiment replaces the matching specified in (a) to (c) of FIG. 5 with matching that consumes an order with a preferential price. Here, the preferential price represents a low price in the sell order and represents a high price in the buy order. The execution device according to the first embodiment extracts k sell orders in order from the lowest one and extracts k buy orders in order from the highest one to match the sell orders and the buy orders such that no intersection is produced there by creating matching that consumes an order with the preferential price.

Figure 6:
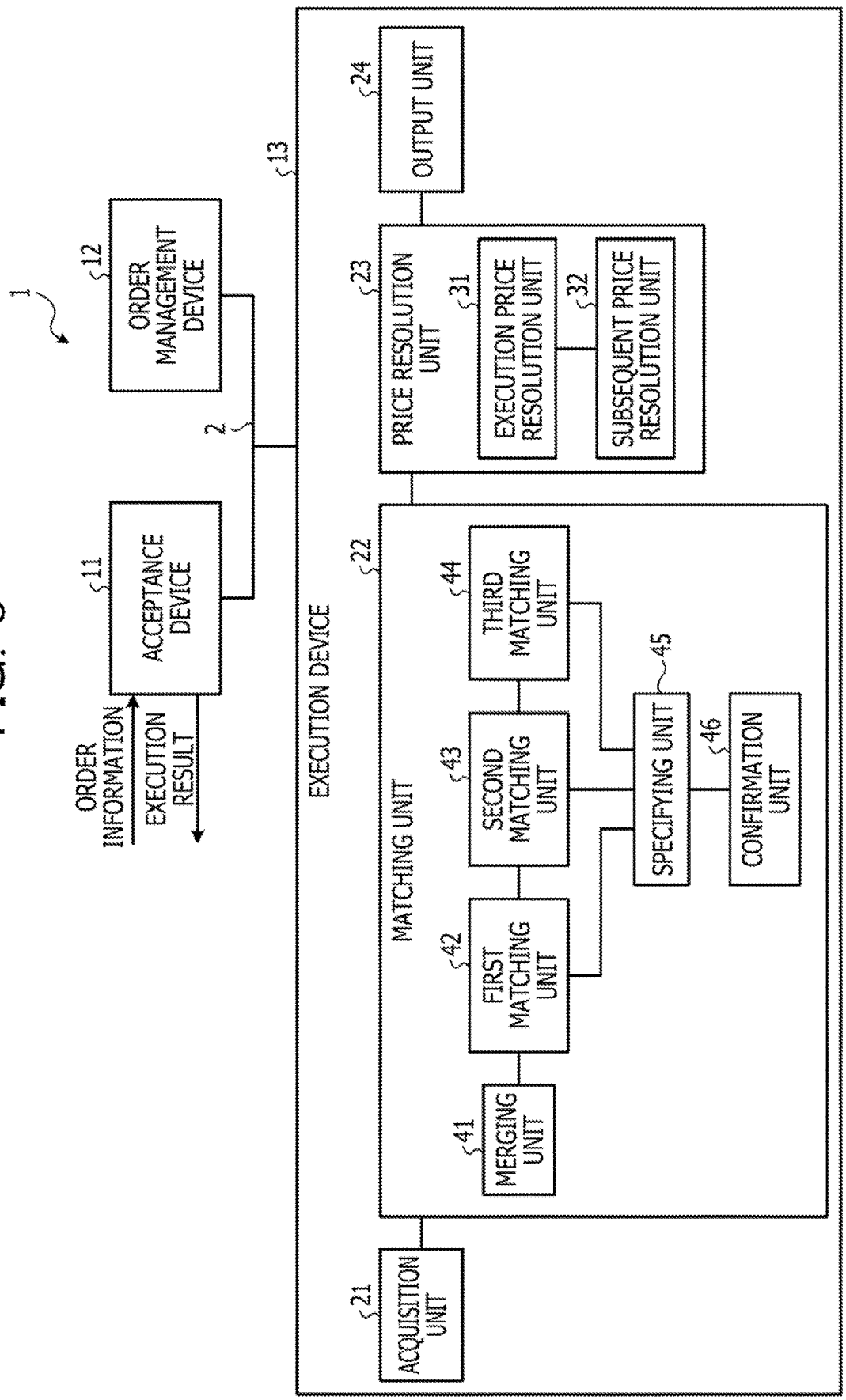
FIG. 6 is a diagram illustrating a configuration of a trading system according to the first embodiment.

Next, a configuration of the trading system according to the first embodiment will be described. FIG. 6 is a diagram illustrating a configuration of the trading system according to the first embodiment. As illustrated in FIG. 6, a trading system 1 according to the first embodiment includes an acceptance device 11, an order management device 12, and an execution device 13. The acceptance device 11, the order management device 12, and the execution device 13 are connected by an internal network 2.

The acceptance device 11 accepts order information and transmits the accepted order information to the order management device 12. For example, the order information contains an orderer identifier that identifies the orderer, a brand, a distinction between buying and selling, a limit price, the number of stocks, and the like. The acceptance device 11 receives, for example, the order information transmitted from an information processing device via an external network. The information processing device, for example, transmits the order information based on an order input by an investor using a mouse or a keyboard.

Furthermore, the acceptance device 11 receives an execution result from the order management device 12 and transmits the received execution result to the information processing device. For example, the execution result contains an orderer identifier, a brand, a distinction between buying and selling, an execution price, the number of executed stocks, and the like. The acceptance device 11 transmits the execution result to the information processing device from which the order information was transmitted, for example, using an Internet protocol (IP) address associated with the orderer identifier.

The order management device 12 manages the order information by appending, for example, an order identifier that identifies the order. The order management device 12 stores all pieces of order information accepted by the acceptance device 11. Additionally, the order management device 12 transmits information on a new order and the present price to the execution device 13 for each brand. Furthermore, the order management device 12 receives execution information for each brand from the execution device 13 and updates the order information. In addition, the order management device 12 creates an execution result based on the execution information and transmits the created execution result to the acceptance device 11. For example, the execution information contains a sell limit, a buy limit, an execution price, the number of executed stocks, and the like for one or more executions.

Furthermore, the order management device 12 merges a new sell order higher than the present price and a new buy order at the present price or lower with existing orders based on an instruction from the execution device 13.

In addition, the order management device 12 responds to an order search request from the execution device 13. The order search request from the execution device 13 includes a search request for a buy order at a predetermined price or higher and a search request for a sell order at a predetermined price or lower. In order to speed up the response to these search requests, the order management device 12 manages orders using a balanced binary tree. The balanced binary tree is a binary tree that automatically attempts to keep the height of the tree (the number of hierarchies from the root) as low as possible.

Figure 7:
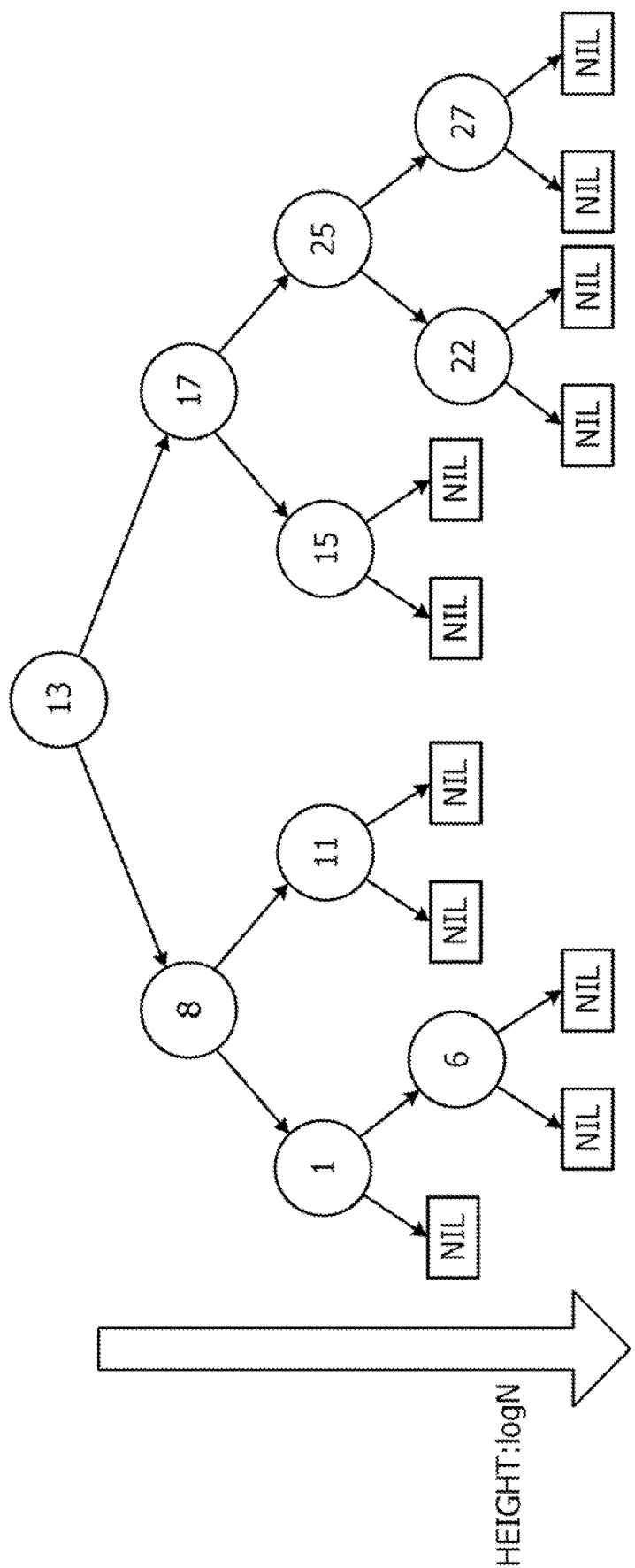
FIG. 7 is a diagram illustrating an example of a balanced binary tree.

FIG. 7 is a diagram illustrating an example of a balanced binary tree. As illustrated in FIG. 7, in the balanced binary tree, each node has a value, and every node is connected to two left and right descendant nodes. Furthermore, the value allocated to the left descendant node of the current node is smaller than the value allocated to the current node, and the value allocated to the right descendant node of the current node is larger than the value allocated to the current node. NIL indicates that there is no descendant. The balanced binary tree includes the Adelson-Velskii and Landis (AVL)-tree, red-black tree, Treap, and splay tree, for example.

Figure 8:
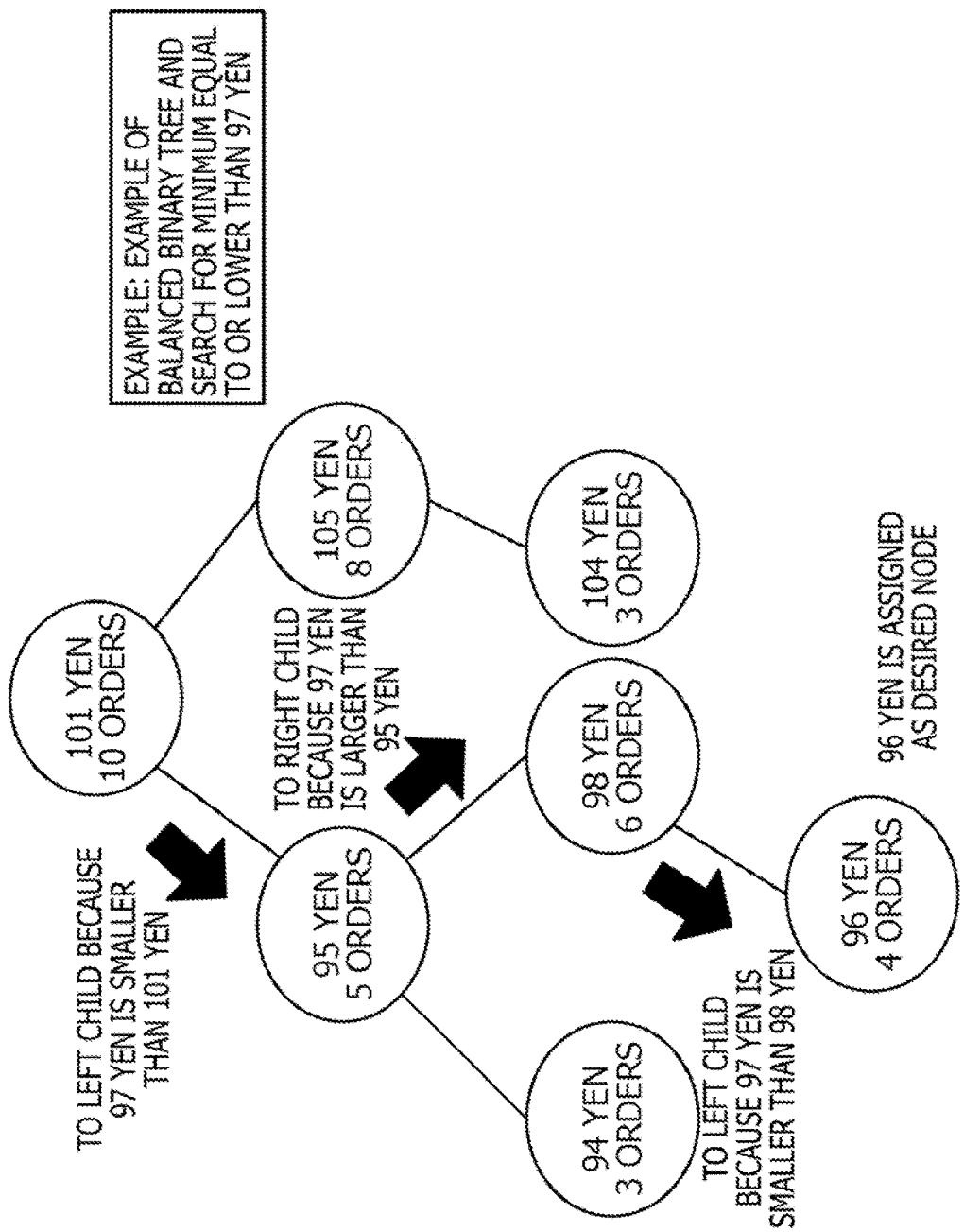
FIG. 8 is a diagram illustrating an example in which an order management device manages orders using a balanced binary tree.

FIG. 8 is a diagram illustrating an example in which the order management device 12 manages orders using the balanced binary tree. Although FIG. 8 illustrates a case where sell orders are managed, the order management device 12 manages the buy orders in a similar manner. As illustrated in FIG. 8, the order management device 12 manages the order prices and the number of orders using the nodes. In each node, the price of the left descendant node is lower than the price of the current node, and the price of the right descendant node is higher than the price of the current node. The order management device 12 performs balancing processing when inserting data in order to restrain the expansion in height of the tree. The balancing processing varies between AVL-tree, red-black tree, Treap, splay tree, and the like.

For example, when a search request for a sell order at 97 yen or lower is given from the execution device 13, the order management device 12 searches the balanced binary tree from the root to proceed to the left child because 97 yen is smaller than 101 yen and proceed to the right child because 97 yen is larger than 95 yen. Then, since 97 yen is smaller than 98 yen, the order management device 12 proceeds to the left child and reaches the node of 96 yen. Then, since there is no node ahead of the node of 96 yen, the order management device 12 responds with the sell at 96 yen as the search result.

For example, when receiving the search request for the sell order at a predetermined price or lower, the order management device 12 responds with information on a sell order having a maximum price equal to or lower than the predetermined price, as a search result. Furthermore, the order management device 12 responds that the sell order does not exist when a sell order at the predetermined price or lower is not found.

Similarly, when receiving a search request for a buy order at a predetermined price or higher, the order management device 12 responds with information on a buy order having a minimum price equal to or higher than the predetermined price, as a search result. Furthermore, the order management device 12 responds that the buy order does not exist when a buy order at the predetermined price or higher is not found.

In this manner, the order management device 12 may respond to the order search request from the execution device 13 at high speed by managing orders using the balanced binary tree. Assuming that the number of orders to be managed is N, the order management device 12 can perform a search with a calculation amount of $O(\log(N))$.

Returning to FIG. 6, the execution device 13 receives information on new orders and the present price for each brand from the order management device 12 via the internal network 2 and executes the sell order and the buy order to resolve the execution price and the subsequent stock price. Each piece of the information on sell orders contains the sell limit and the number of sell orders, and each piece of the information on buy orders contains the buy limit and the number of buy orders. Furthermore, the execution device 13 transmits the execution information to the order management device 12 for each brand via the internal network 2.

The execution device 13 includes an acquisition unit 21, a matching unit 22, a price resolution unit 23, and an output unit 24. The acquisition unit 21 receives information on new orders and the present price for each brand from the order management device 12 via the internal network 2.

The matching unit 22 matches the sell orders and the buy orders for each brand. The matching unit 22 performs matching regardless of the present price if the limit price or a price more favorable to the investor than the limit price is given.

The matching unit 22 includes a merging unit 41, a first matching unit 42, a second matching unit 43, a third matching unit 44, a specifying unit 45, and a confirmation unit 46.

The merging unit 41 instructs the order management device 12 to merge a sell order higher than the present price and a buy order at the present price or lower with existing orders.

The first matching unit 42 determines whether or not there is an existing buy order at the sell limit of the new sell order or higher and, when there is the existing buy order, matches the new sell order and the existing buy order. The first matching unit 42 triggers the order management device 12 to search for an existing buy order at the sell limit of the new sell order or higher, thereby determining whether or not there is an existing buy order at the sell limit of the new sell order or higher. The first matching unit 42 matches the new sell order with an existing buy order that is equal to or higher than the sell limit of the new sell order and has a minimum buy limit.

The second matching unit 43 determines whether or not there is an existing sell order at the buy limit of a new buy order or lower and, when there is the existing sell order, matches the new buy order and the existing sell order. The second matching unit 43 triggers the order management device 12 to search for an existing sell order at the buy limit of the new buy order or lower, thereby determining whether or not there is an existing sell order at the buy limit of the new buy order or lower. The second matching unit 43 matches the new buy order with an existing sell order that is equal to or lower than the buy limit of the new buy order and has a maximum sell limit.

The third matching unit 44 matches a new sell order and a new buy order remaining after the processing by the merging unit 41, the first matching unit 42, and the second matching unit 43.

The specifying unit 45 specifies the maximum number of executions by totaling the number of matches by the first matching unit 42, the number of matches by the second matching unit 43, and the number of matches by the third matching unit 44.

The confirmation unit 46 specifies matching that consumes an order with the preferential price and confirms the executions based on the maximum number of executions specified by the specifying unit 45.

Based on the matching by the matching unit 22, the price resolution unit 23 resolves the execution price per match and the subsequent stock price per brand. The price resolution unit 23 includes an execution price resolution unit 31 and a subsequent price resolution unit 32.

Assuming that the sell limit is s yen, the buy limit is b (s≤b) yen, and the present price is p yen, the execution price resolution unit 31 designates the execution price also as p yen when p is contained in the interval [s, b]. On the other hand, when p is not contained in the interval [s, b], the execution price resolution unit 31 designates the execution price as a value closest to p yen, which means to designate the execution price as s yen if p<s holds, and to designate the execution price as b yen If b<p holds.

The subsequent price resolution unit 32 resolves the subsequent stock price based on the execution price resolved by the execution price resolution unit 31. For example, the subsequent price resolution unit 32 designates an average value of all the execution prices as the subsequent stock price.

The output unit 24 transmits the execution information to the order management device 12 via the internal network 2 for each brand.

Figure 9:
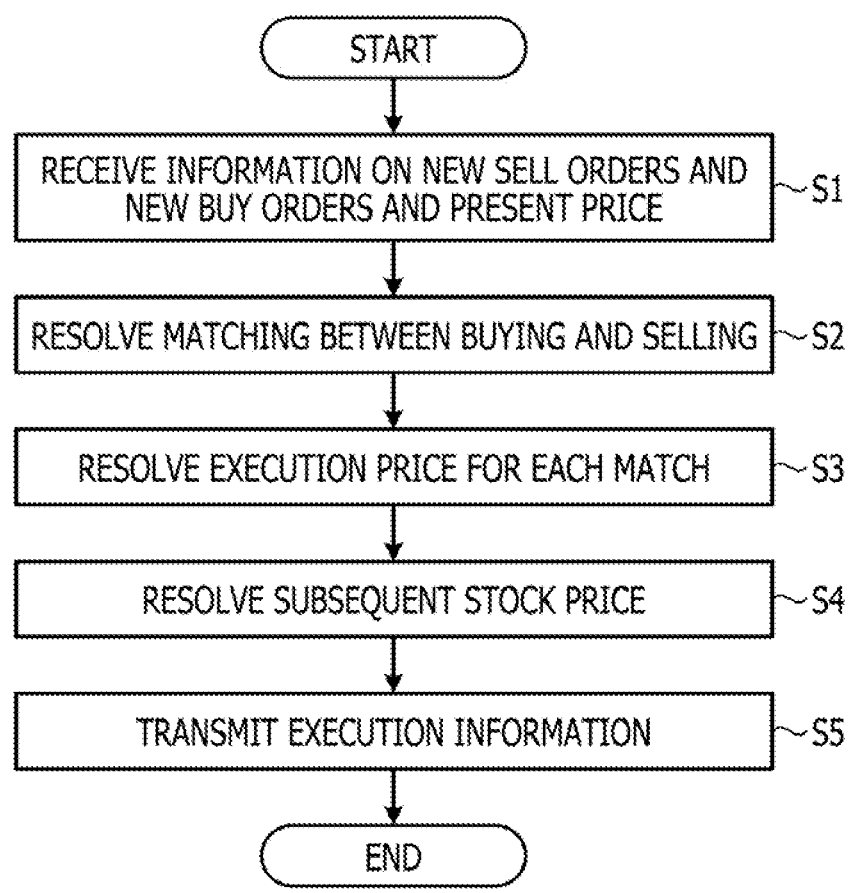
FIG. 9 is a flowchart illustrating a flow of processing by the execution device.

Next, a flow of processing by the execution device 13 will be described. FIG. 9 is a flowchart illustrating a flow of processing by the execution device 13. Note that the execution device 13 performs the processing illustrated in FIG. 9 for each brand. As illustrated in FIG. 9, the execution device 13 receives information on new sell orders and new buy orders and the present price from the order management device 12 (step S1).

Then, the execution device 13 resolves the matching between buying and selling (step S2). The execution device 13 performs matching regardless of the present price if the limit price or a price more favorable to the investor than the limit price is given. Then, the execution device 13 resolves the execution price for each match (step S3) and resolves the subsequent stock price (step S4). Then, the execution device 13 transmits the execution information to the order management device 12 (step S5).

In this manner, the execution device 13 performs matching between buying and selling regardless of the present price if the limit price or a price more favorable to the investor than the limit price is given, and resolves the execution price for each match. Consequently, the number of executions may be increased.

Figure 10:
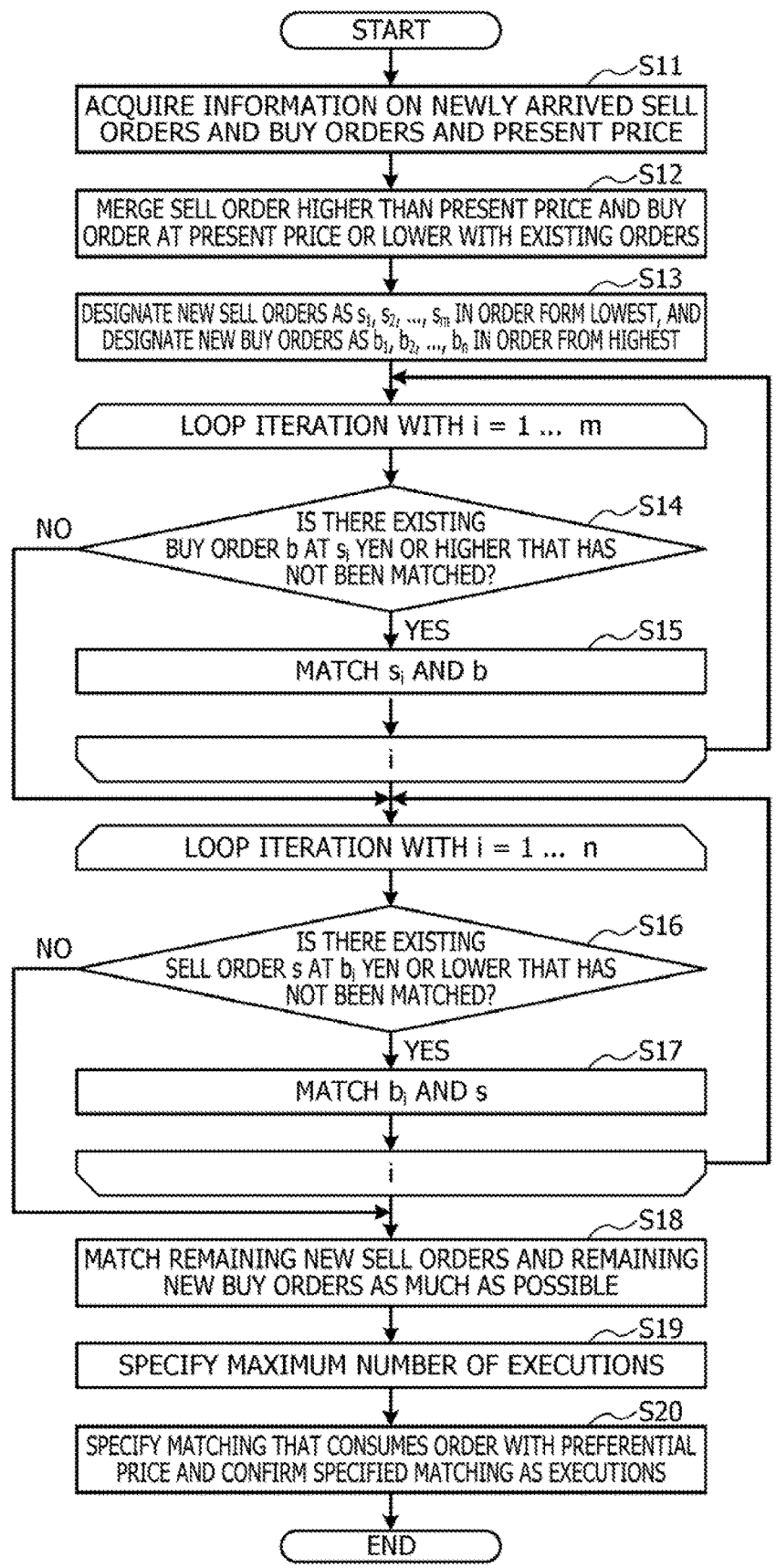
FIG. 10 is a flowchart illustrating a flow of processing by a matching unit.

Next, a flow of processing by the matching unit 22 will be described. FIG. 10 is a flowchart illustrating a flow of processing by the matching unit 22. As illustrated in FIG. 10, the matching unit 22 acquires information on newly arrived sell orders and buy orders and the present price from the acquisition unit 21 (step S11), and merges a sell order higher than the present price and a buy order at the present price or lower with existing orders (step S12). Then, the matching unit 22 designates new sell orders as $s_1, s_2, \ldots, s_m$ in the order from the lowest, and designates new buy orders as $b_1, b_2, \ldots, b_n$ in the order from the highest (step S13).

Thereafter, the matching unit 22 repeats the following processing in steps S14 and S15 while incrementing i from 1. For example, the matching unit 22 determines whether or not there is an existing buy order b at $s_i$ yen or higher that has not been matched (step S14) and, when there is the existing buy order b at $s_i$ yen or higher that has not been matched, matches $s_i$ and b (step S15).

The matching unit 22 repeats the processing in steps S14 and S15 by incrementing i to m while there is the existing buy order b at $s_i$ yen or higher that has not been matched. When the iterative processing is completed, the matching unit 22 specifies m as the number of matches for the new sell orders. On the other hand, when there is no existing buy order b at $s_i$ yen or higher that has not been matched, the matching unit 22 escapes from the iteration and specifies i−1 as the number of matches for the new sell orders.

Then, the matching unit 22 repeats the following processing in steps S16 and S17 while incrementing i from 1. For example, the matching unit 22 determines whether or not there is an existing sell order s at $b_i$ yen or lower that has not been matched (step S16) and, when there is the existing sell order s at $b_i$ yen or lower that has not been matched, matches $b_i$ and s (step S17).

The matching unit 22 repeats the processing in steps S16 and S17 by incrementing i to n while there is the existing sell order s at $b_i$ yen or lower that has not been matched. When the iterative processing is completed, the matching unit 22 specifies n as the number of matches for the new buy orders. On the other hand, when there is no existing sell order s at $b_i$ yen or lower that has not been matched, the matching unit 22 escapes from the iteration and specifies i−1 as the number of matches for the new buy orders.

Then, the matching unit 22 matches the remaining new sell orders and the remaining new buy orders as much as possible (step S18), and specifies the number of matched orders as the number of matches between the new orders. Thereafter, the matching unit 22 specifies the maximum number of executions by adding the number of matches for the new sell orders, the number of matches for the new buy orders, and the number of matches between the new orders (step S19). Following the above, the matching unit 22 specifies matching that consumes an order with the preferential price and confirms the specified matching as executions based on the maximum number of executions (step S20).

In this manner, the matching unit 22 specifies the maximum number of executions by matching a new sell order and an existing buy order, a new buy order and an existing sell order, and a new sell order and a new buy order. Then, the matching unit 22 may specify the executions based on the maximum number of executions by specifying matching that consumes the order with the preferential price.

As described above, in the first embodiment, the merging unit 41 merges a new sell order higher than the present price and a new buy order at the present price or lower with existing orders. Then, the first matching unit 42 determines whether or not there is an existing buy order equal to or higher than the sell limit of a new sell order at the present price or lower and, when there is the existing buy order, matches the new sell order at the present price or lower and the existing buy order. Thereafter, the second matching unit 43 determines whether or not there is an existing sell order equal to or lower than the buy limit of a new buy order higher than the present price and, when there is the existing sell order, matches the new buy order higher than the present price and the existing sell order. Following the above, the third matching unit 44 matches a remaining new sell order and a remaining new buy order. Then, the specifying unit 45 specifies the maximum number of executions by totaling the number of matches between the new sell orders at the present price or lower and the existing buy orders, the number of matches between the new buy orders higher than the present price and the existing sell orders, and the number of matches between the remaining new sell orders and the remaining new buy orders. Thereafter, the confirmation unit 45 specifies matching that consumes an order with the preferential price and confirms the executions based on the maximum number of executions specified by the specifying unit 45. Consequently, the execution device 13 may increase the number of executions in Zaraba.

Furthermore, in the first embodiment, the merging unit 41 triggers the order management device 12 to merge a new sell order higher than the present price and a new buy order at the present price or lower with existing orders. In addition, by triggering the order management device 12 to search for an existing buy order at the sell limit of the new sell order or higher, the first matching unit 42 determines, for each new sell order, whether or not there is an existing buy order equal to or higher than the sell limit of the new sell order at the present price or lower. Additionally, by triggering the order management device 12 to search for an existing sell order at the buy limit of the new buy order or lower, the second matching unit 43 determines, for each new buy order, whether or not there is an existing sell order equal to or lower than the buy limit of the new buy order higher than the present price. Consequently, the execution device 13 may accurately match the sell orders and the buy orders based on the order information managed by the order management device 12.

Furthermore, in the first embodiment, since the order management device 12 manages information on orders using the balanced binary tree, a search for an existing buy order at the sell limit of the new sell order or higher and a search for an existing sell order at the buy limit of the new buy order or lower may be performed at high speed.

Note that, in the first embodiment, a case where the trading system 1 includes the acceptance device 11, the order management device 12, and the execution device 13 has been described. However, the functions of the acceptance device 11, the order management device 12, and the execution device 13 may be integrated into one and configured as the trading device. Alternatively, any two functions may be integrated into one, for example, the functions of the acceptance device 11 and the order management device 12 may be integrated into one, and formed as one device.

Furthermore, in the first embodiment, the case of trading stocks has been described, but the trading system 1 may trade other securities and articles.

Second Embodiment

Note that, in the above first embodiment, a case where newly arrived orders are processed at any time has been described, but the trading system may process all orders at regular time intervals such as 0.1 milliseconds, for example. Thus, in a second embodiment, a trading system that processes all orders at regular time intervals will be described.

Figure 11:
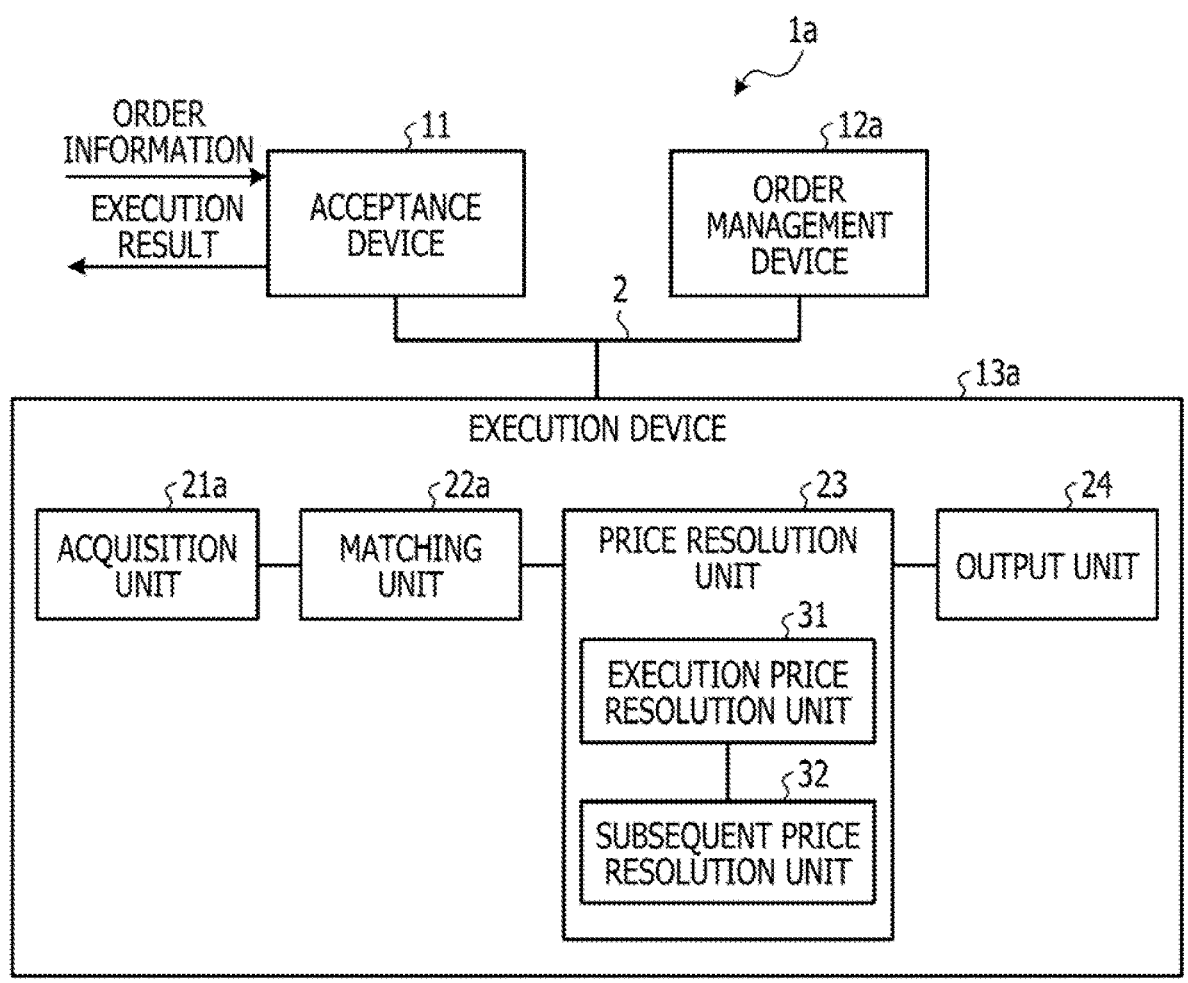
FIG. 11 is a diagram illustrating a configuration of a trading system according to a second embodiment.

FIG. 11 is a diagram illustrating a configuration of the trading system according to the second embodiment. Note that, here, for convenience of explanation, functional units having similar roles as the respective units illustrated in FIG. 6 are denoted by the same reference signs, and detailed description thereof will be omitted. As illustrated in FIG. 11, a trading system 1a according to the second embodiment includes an order management device 12a instead of the order management device 12 and an execution device 13a instead of the execution device 13 as compared with the trading system 1 illustrated in FIG. 6.

The order management device 12a has a function similar to the function of the order management device 12, but instead of transmitting the information on new orders and the present price to the execution device 13a, transmits the sell limit and the number of sell orders, and the buy limit and the number of buy orders to the execution device 13a for each brand at regular time intervals. The order management device 12a transmits the order information to the execution device 13a without the distinction between the new orders and the existing orders. Furthermore, the order management device 12a is not requested by the execution device 13a to search for a buy order at a predetermined price or higher and to search for a sell order at a predetermined price or lower. For this reason, the order management device 12a does not use the balanced binary tree to manage orders.

The execution device 13a includes an acquisition unit 21a instead of the acquisition unit 21 and a matching unit 22a instead of the matching unit 22 as compared with the execution device 13 illustrated in FIG. 6.

The acquisition unit 21a receives the sell limit and the number of sell orders, and the buy limit and the number of buy orders for each brand from the order management device 12a at regular time intervals without the distinction between the new orders and the existing orders.

Similar to the matching unit 22, the matching unit 22a performs matching regardless of the present price if the limit price or a price more favorable to the investor than the limit price is given. The matching unit 22a matches sell orders and buy orders, but performs the matching without the distinction between the new orders and the existing orders.

The matching unit 22a matches sell orders and buy orders using one matching method from the following five matching methods. In the first matching method, the matching unit 22a performs matching by a full search.

For example, the matching unit 22a creates a list A of j sell orders and a list B of j buy orders. Then, the matching unit 22a selects one combination between the j orders of A and the j orders of B and performs recording processing of recording a combination in which the sell limit is equal to or lower than the buy limit for all the j orders, as a matching candidate. The matching unit 22a executes this recording processing on all combinations between j orders of A and j orders of B while switching the combinations. Moreover, the matching unit 22a executes this recording processing on all combinations between A and B while altering A or B. Additionally, the matching unit 22a performs this recording processing while changing the number of matched orders j from one to u. Here, u denotes a smaller one of the number of sell orders and the number of buy orders.

Then, the matching unit 22a selects optimum matching from among the matching candidates. Here, for example, the optimum matching means that the average of sell limits is the lowest, the average of buy limits is the highest, the number of matches is the largest, there are fewer matches within the same securities company, and the like.

FIG. 12 is a diagram illustrating an example of matching by the first matching method. In FIG. 12, j=12 is employed. In FIG. 12, four sell orders of 98 yen and four buy orders of 98 yen, five sell orders of 99 yen and five buy orders of 100 yen, two sell orders of 100 yen and two buy orders of 101 yen, and one sell order of 101 yen and one buy order of 102 yen are regarded as one matching candidate.

Figure 13:
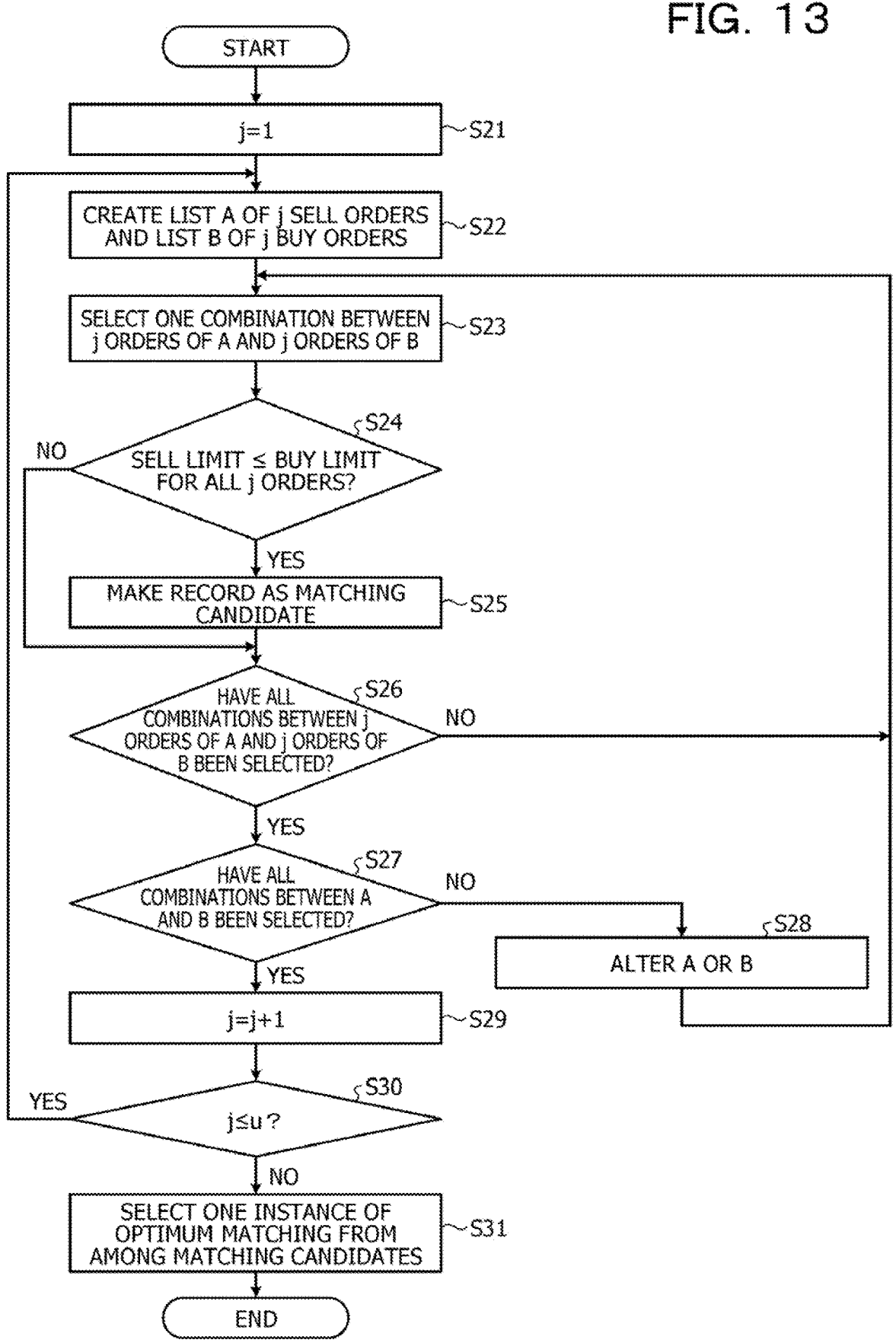
FIG. 13 is a flowchart illustrating a flow of processing by the first matching method.

FIG. 13 is a flowchart illustrating a flow of processing by the first matching method. As illustrated in FIG. 13, the matching unit 22a designates j as one (step S21) and creates a list A of j sell orders and a list B of j buy orders (step S22). Then, the matching unit 22a selects one combination between the j orders of A and the j orders of B (step S23) and determines whether or not the sell limit is equal to or lower than the buy limit for all the j orders (step S24). Thereafter, the matching unit 22a records the selected combination as a matching candidate when the sell limit is equal to or lower than the buy limit for all the j orders (step S25).

Following the above, the matching unit 22a determines whether or not all combinations between the j orders of A and the j orders of B have been selected (step S26) and, when there is a combination that has not been selected, returns to step S23. On the other hand, when all combinations have been selected, the matching unit 22a determines whether or not all combinations between A and B have been selected (step S27) and, when there is a combination between A and B that has not been selected, alters A or B (step S28) to return to step S23.

On the other hand, when ail combinations between A and B have been selected, the matching unit 22a adds one to j (step S29) and determines whether or not j is equal to or less than u (step S30). Then, when j is equal to or less than u, the matching unit 22a returns to step S22 and, when j is not equal to or less than u, selects one instance of optimum matching from among the matching candidates (step S31).

In this manner, the matching unit 22a may specify matching candidates by performing matching by a full search.

In the second matching method, the matching unit 22a executes sell orders and buy orders by performing matching by random selection. For example, the matching unit 22a creates a list A of j sell orders and a list B of j buy orders. Then, the matching unit 22a randomly selects one order from each of A and B at a time to determine whether or not the sell limit is equal to or lower than the buy limit and performs the recording processing of recording a combination in which the sell limit is equal to or lower than the buy limit for all the j orders of A and B, as a matching candidate. The matching unit 22a executes this recording processing on all combinations between A and B while altering A or B. Additionally, the matching unit 22a performs this recording processing while changing the number of matched orders j from one to u. Then, the matching unit 22a selects optimum matching from among the matching candidates.

FIG. 14 is a diagram illustrating an example of executions by the second matching method. In FIG. 14, j=11 is employed. In FIG. 14, two sell orders of 98 yen and two buy orders of 101 yen, five sell orders of 99 yen and five buy orders of 100 yen, three sell orders of 100 yen and three buy orders of 104 yen, and one sell order of 101 yen and one buy order of 102 yen are regarded as one matching candidate.

Figure 15:
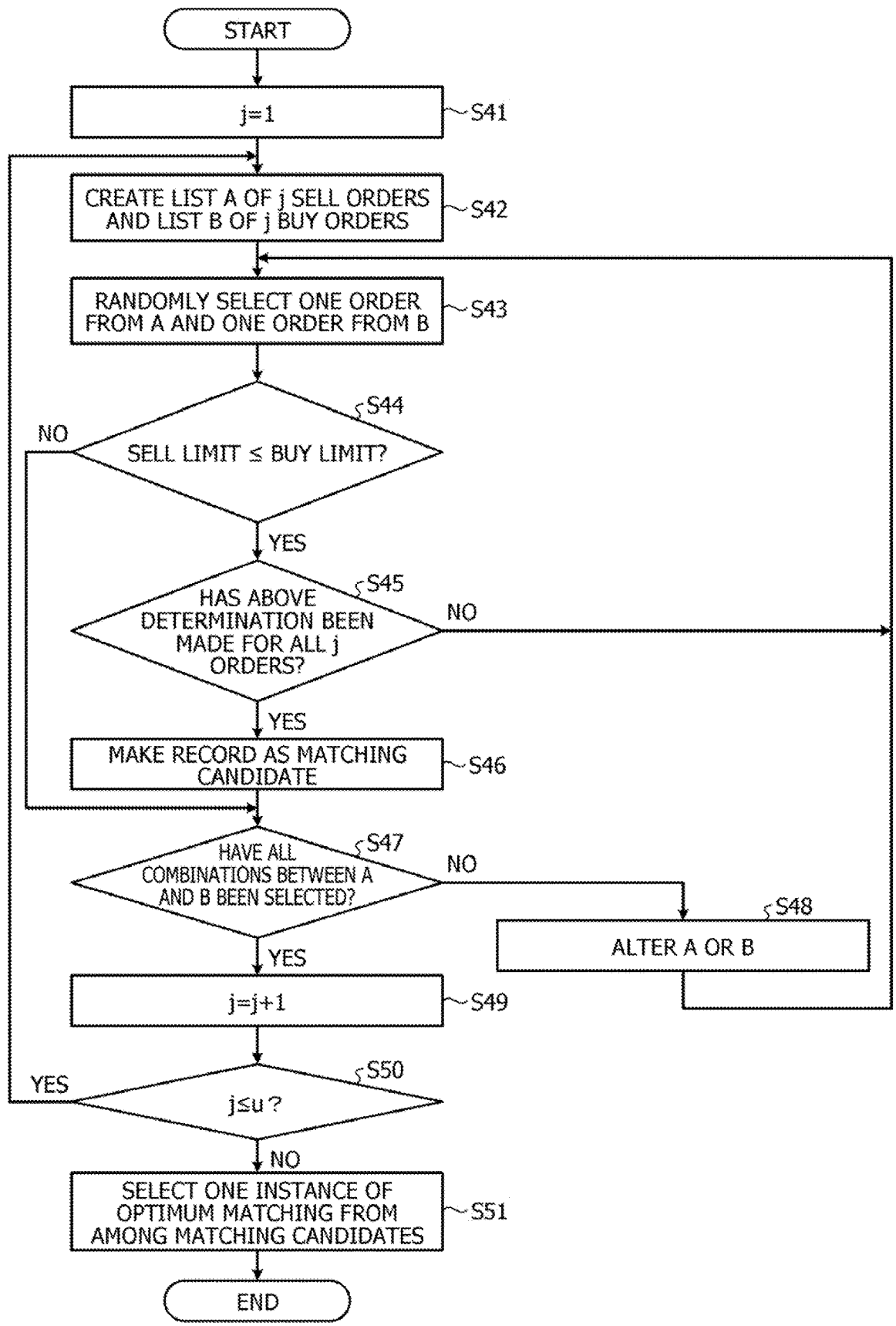
FIG. 15 is a flowchart illustrating a flow of processing by the second matching method.

FIG. 15 is a flowchart illustrating a flow of processing by the second matching method. As illustrated in FIG. 15, the matching unit 22a designates j as one (step S41) and creates a list A of j sell orders and a list B of j buy orders (step S42). Then, the matching unit 22a randomly selects one order from A and one order from B (step S43) and determines whether or not the sell limit is equal to or lower than the buy limit (step S44). Note that the matching unit 22a deletes the selected single orders from A and B.

Then, when the sell limit is not equal to or lower than the buy limit, the matching unit 22a proceeds to step S47 and, when the sell limit is equal to or lower than the buy limit, determines whether or not the determination has been made for all the j orders (step S45). Thereafter, when A and B have a self order and a buy order for which the determination has not been made, respectively, the matching unit 22a returns to step S43 and, when the determination has been made for all the j orders, records the combination of the randomly selected j orders as a matching candidate (step S46).

Following the above, the matching unit 22a determines whether or not all combinations between A and B have been selected (step S47) and, when there is a combination between A and B that has not been selected, alters A or B (step S48) to return to step S43.

On the other hand, when all combinations between A and B have been selected, the matching unit 22a adds one to j (step S49) and determines whether or not j is equal to or less than u (step S50). Then, when j is equal to or less than u, the matching unit 22a returns to step S42 and, when j is not equal to or less than u, selects one instance of optimum matching from among the matching candidates (step S51).

In this manner, the matching unit 22a may specify matching candidates by performing matching by random selection.

In the third matching method, the matching unit 22a performs matching by a branch and bound method. For example, the matching unit 22a performs a depth-first search in matching sell orders and buy orders and, when determining at a certain search point that optimum matching will not be obtained even if a deeper search is performed, does not perform a deeper search.

Figure 16:
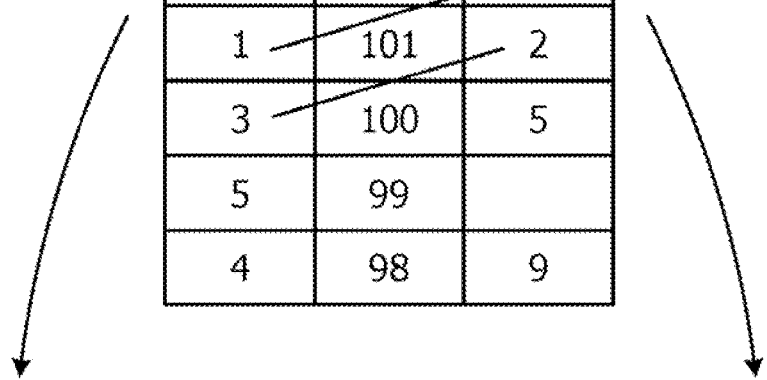
FIG. 16 is a diagram for explaining a third matching method.

FIG. 16 is a diagram for explaining the third matching method. In FIG. 16, the matching unit 22a performs searches for four sell orders of 102 yen and four buy orders of 104 yen, one sell order of 101 yen and one buy order of 102 yen, and two sell orders of 100 yen and two buy orders of 101 yen in this order. Then, when subsequently performing searches for four sell orders of 98 yen and four buy orders of 100 yen, the matching unit 22a determines that optimum matching will not be obtained even if a deeper search is performed and deletes the four sell orders of 98 yen and the four buy orders of 100 yen. Thereafter, the subsequent search is performed from five sell orders of 99 yen and five buy orders of 100 yen.

Figure 17:
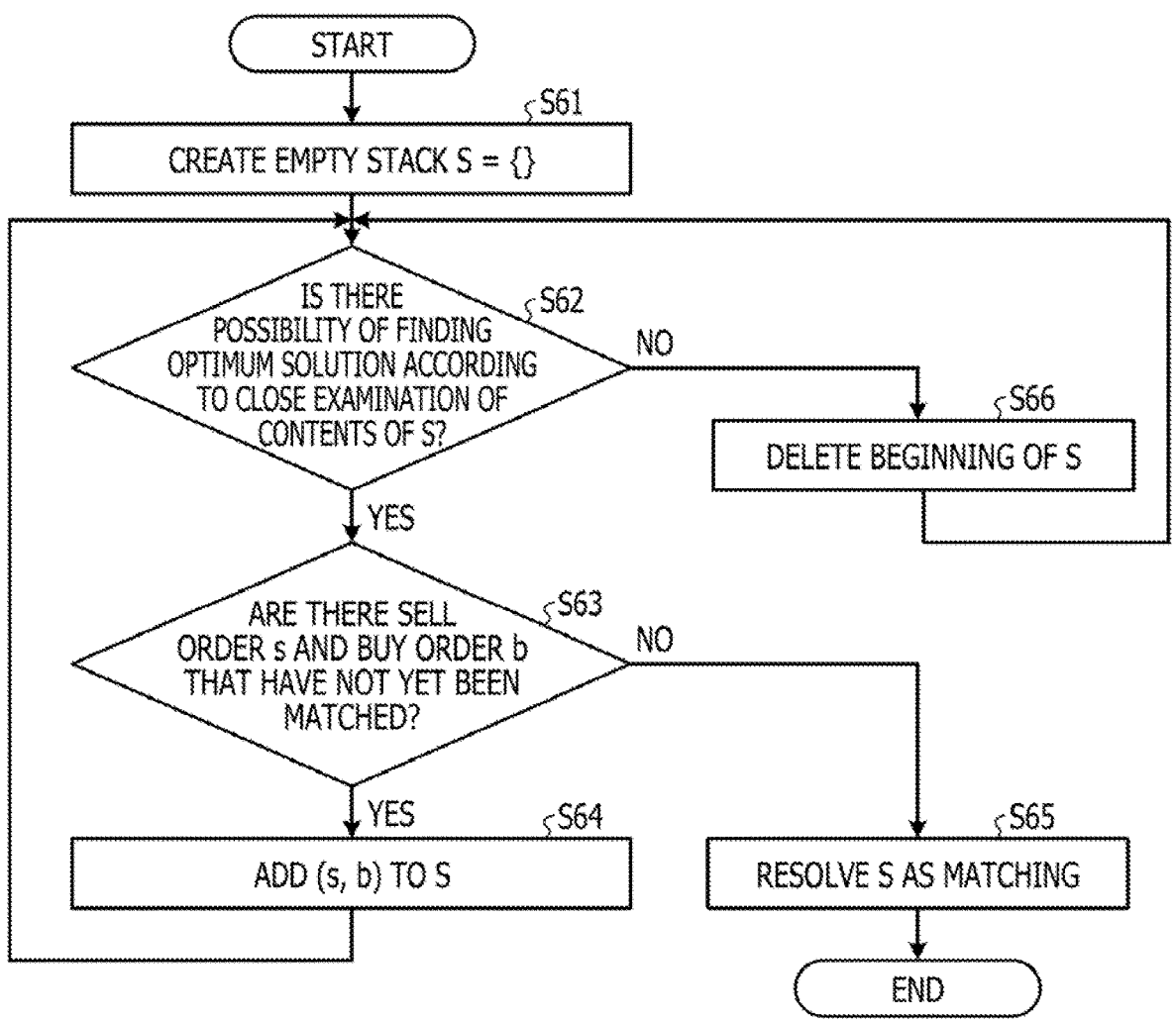
FIG. 17 is a flowchart illustrating a flow of processing by the third matching method.

FIG. 17 is a flowchart illustrating a flow of processing by the third matching method. As illustrated in FIG. 17, the matching unit 22a creates an empty stack S={ } (step S61) and examines the contents of S closely to determine whether or not there is the possibility of finding the optimum solution (step S62).

Then, when it is determined that there is the possibility of finding the optimum solution, the matching unit 22a determines whether or not there are a sell order s and buy order b that have not yet been matched (step S63) and, when there are the sell order s and the buy order b, adds (s, b) to S (step S64) to return to step S62. On the other hand, when there are no sell order s and no buy order b that have not been matched yet, the matching unit 22a resolves S as matching (step S65).

Furthermore, when it is determined in step S62 that there is no possibility of finding the optimum solution, the matching unit 22a deletes the beginning of S (step S66) to return to step S62.

In this manner, the matching unit 22a may enhance the search efficiency by pruning.

In the fourth matching method, the matching unit 22a uses a genetic algorithm to match sell orders and buy orders. For example, the matching unit 22a assigns a mating rule for two matching plans beforehand and mates the two matching plans according to the mating rule to prepare a subsequent-generation matching plan. The matching unit 22a creates a better matching plan by repeating the creation of the subsequent-generation matching plan. The matching unit 22a creates, for example, matching plans for several thousands of generations.

FIG. 18 is a diagram illustrating an example of the mating rule. As illustrated in FIG. 18, the matching unit 22a prepares the subsequent-generation matching plan by joining up two matching plans. However, when conflict occurs in matching by joining up the two matching, plans, the matching unit 22a makes adjustments. For example, in FIG. 18, mating produces conflict between a match between four sell orders of 102 yen and four buy orders of 104 yen and a match between three sell orders of 103 yen and three buy orders of 104 yen. In such a case, for example, the matching unit 22a makes adjustments such as decreasing the number of orders of each match so as to suppress conflict.

Figure 19:
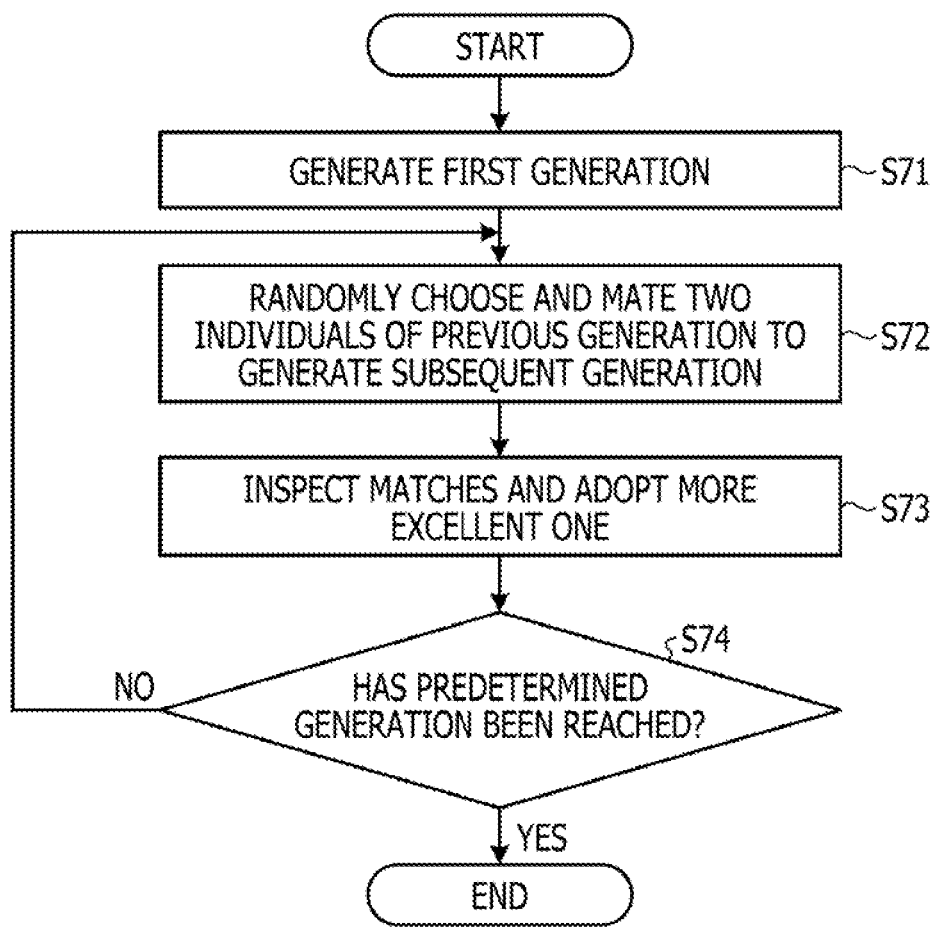
FIG. 19 is a flowchart illustrating a flow of processing by the fourth matching method.

FIG. 19 is a flowchart illustrating a flow of processing by the fourth matching method. As illustrated in FIG. 19, the matching unit 22a generates a first generation (step S71). For example, the matching unit 22a generates a fixed number of matches between single sells and single buys to designate the generated matches as the first generation.

Then, the matching unit 22a randomly chooses and mates two individuals of the previous generation to generate a subsequent generation (step S72). Thereafter, the matching unit 22a inspects the matches and adopts a more excellent one (step S73). Following the above, the matching unit 22a determines whether or not a predetermined generation has been reached (step S74) and returns to step S72 when the predetermined generation has not been reached, while designating the predetermined generation as a matching result when the predetermined generation has been reached.

Figure 20A:
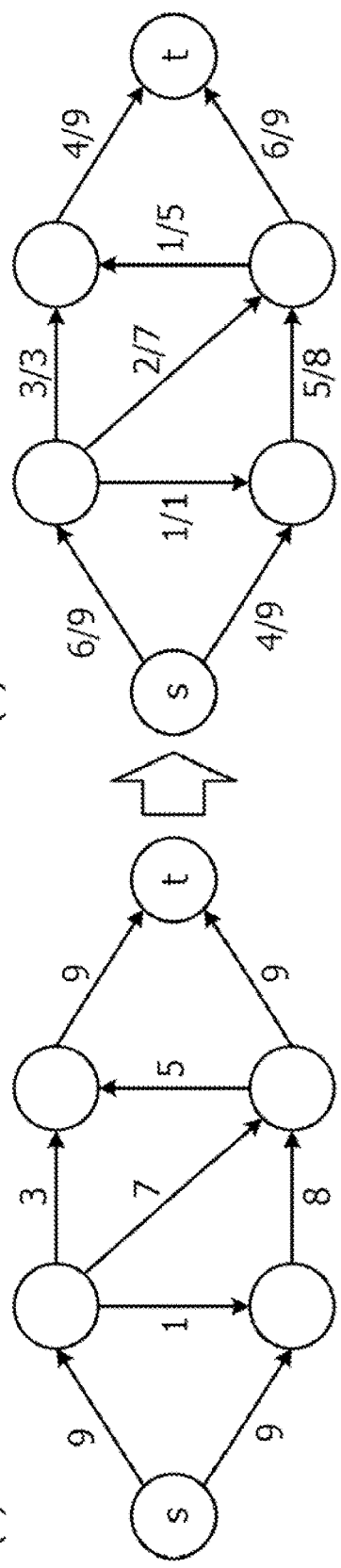
FIG. 20A is a diagram for explaining a maximum flow problem for a network flow.

In the fifth matching method, the matching unit 22a performs matching that maximizes the number of matches by formulating the depth of market table as a network flow. FIG. 20A is a diagram for explaining a maximum flow problem for a network flow. As illustrated in FIG. 20A, the maximum flow problem is a problem to work out at what rate on which edge of the graph water needs to be flowed in order to flow as much water as possible from a vertex s (source) to a vertex t (sink) along the edges. However, as illustrated in (a) of FIG. 20A, the maximum capacity for flowing water is set on each edge. In FIG. 20A, (b) illustrates a solution where the fraction near each edge denotes the capacity in the denominator and the flow rate in the numerator. In (b) of FIG. 20A, 10 of water flows from s to t at maximum.

Figure 20B:
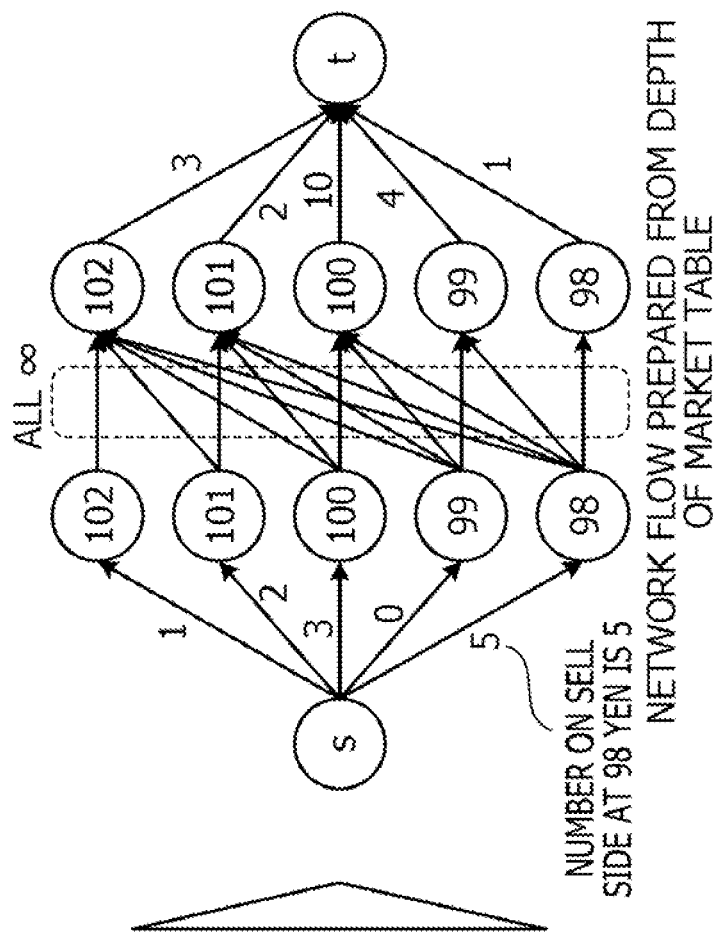
FIG. 20B is a diagram for explaining the formulation of a depth of market table as a network flow.

FIG. 20B is a diagram for explaining the formulation of the depth of market table as a network flow. As illustrated in FIG. 20B, the matching unit 22a creates vertices according to s (source), t (sink), the sell limits, and the buy limits. Then, the matching unit 22a designates the capacities between the sell vertices and the buy vertices as ∞ (no restriction), designates the capacity of an edge from s to a sell vertex as the number of sell orders with the sell limit of the sell vertex, and designates the capacity of an edge from a buy vertex to t as the number of buy orders with the buy limit of the buy vertex.

In FIG. 20B, the capacity of an edge from s to the sell vertex of 9S yen is five, the capacity of an edge from s to the sell vertex of 99 yen is zero, and the capacity of an edge from s to the sell vertex of 100 yen is three. Furthermore, the capacity of an edge from s to the sell vertex of 101 yen is two, and the capacity of an edge from s to the sell vertex of 102 yen is one.

Similarly, the capacity of an edge from the buy vertex of 98 yen to t is one, the capacity of an edge from the buy vertex of 99 yen to t is four, and the capacity of an edge from the buy vertex of 100 yen to t is ten. Furthermore, the capacity of an edge from the buy vertex of 101 yen to t is two, and the capacity of an edge from the buy vertex of 102 yen to t is three.

Figure 20C:
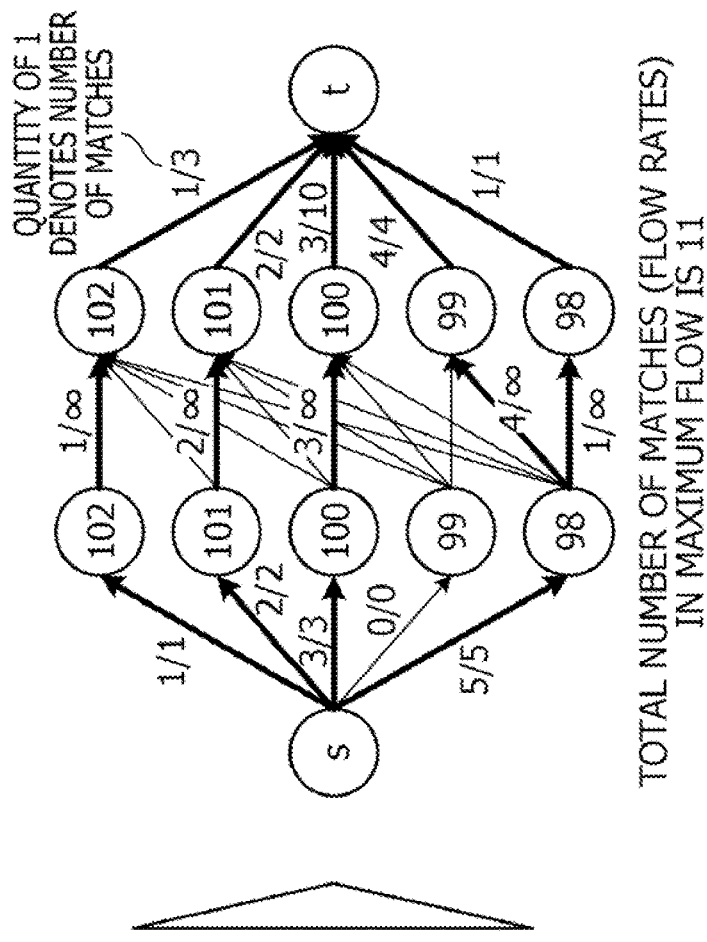
FIG. 20C is a diagram illustrating the maximum flow of the network flow illustrated in FIG. 20B.
Figure 20C:
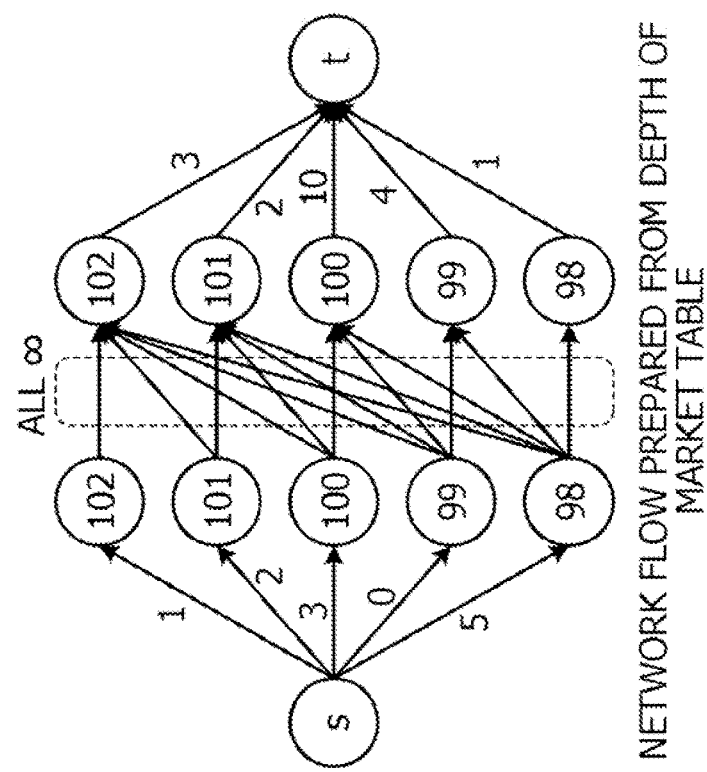

FIG. 20C is a diagram illustrating the maximum flow of the network flow illustrated in FIG. 20B. In FIG. 20C, the flow rate on each edge indicates the number of matches, and the total number of matches is 11. For example, a total of 11 matches are performed, which is made up of a match between one sell at 98 yen and one buy at 98 yen, a match between four sells at 98 yen and four buys at 99 yen, a match between three sells at 100 yen and three buys at 100 yen, a match between two sells at 101 yen and two buys at 101 yen, and a match between one sell at 102 yen and one buy at 102 yen.

The matching unit 22a uses algorithms such as Hopcroft-Karp algorithm, Dinic algorithm, and Edmonds-Karp algorithm as algorithms for solving the maximum flow problem. Assuming that the number of vertices is V and the number of edges is E, the calculation amount of Hopcroft-Karp algorithm is $O(E\sqrt{V})$, the calculation amount of Dinic algorithm is $O(V^2E)$, and the calculation amount of Edmonds-Karp algorithm is $O(VE^2)$.

Figure 21:
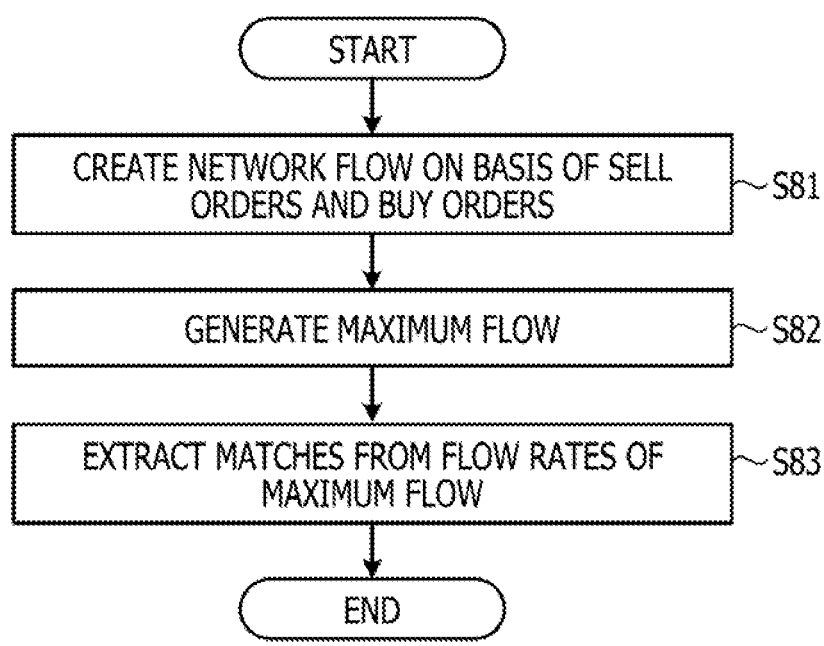
FIG. 21 is a flowchart illustrating a flow of processing by the fifth matching method.

FIG. 21 is a flowchart illustrating a flow of processing by the fifth matching method. As illustrated in FIG. 21, the matching unit 22a creates a network flow on the basis of sell orders and buy orders (step S81). Then, the matching unit 22a generates the maximum flow (step S82) and extracts matches from the flow rates of the maximum flow (step S83).

In this manner, the matching unit 22a may specify matching with the maximum number of matches by formulating the depth of market table as a network flow.

As described above, in the second embodiment, the matching unit 22a performs matching based on information on all sell orders and buy orders at regular time intervals without the distinction between new orders and existing orders. Therefore, for a brand with a small number of orders, the matching processing may be performed at high speed without sending a search request to the order management device 12a during the matching processing.

Note that, in the second embodiment, a case where trading is performed in Zaraba has been described, but the trading system 1a may perform trading in Itayose.

Furthermore, in the first and second embodiments, the execution devices 13 and 13a have been described. However, by implementing the components included in the execution devices 13 and 13a by software, an execution program that has a similar function may be obtained. Thus, a computer that executes the execution program will be described.

Figure 22:
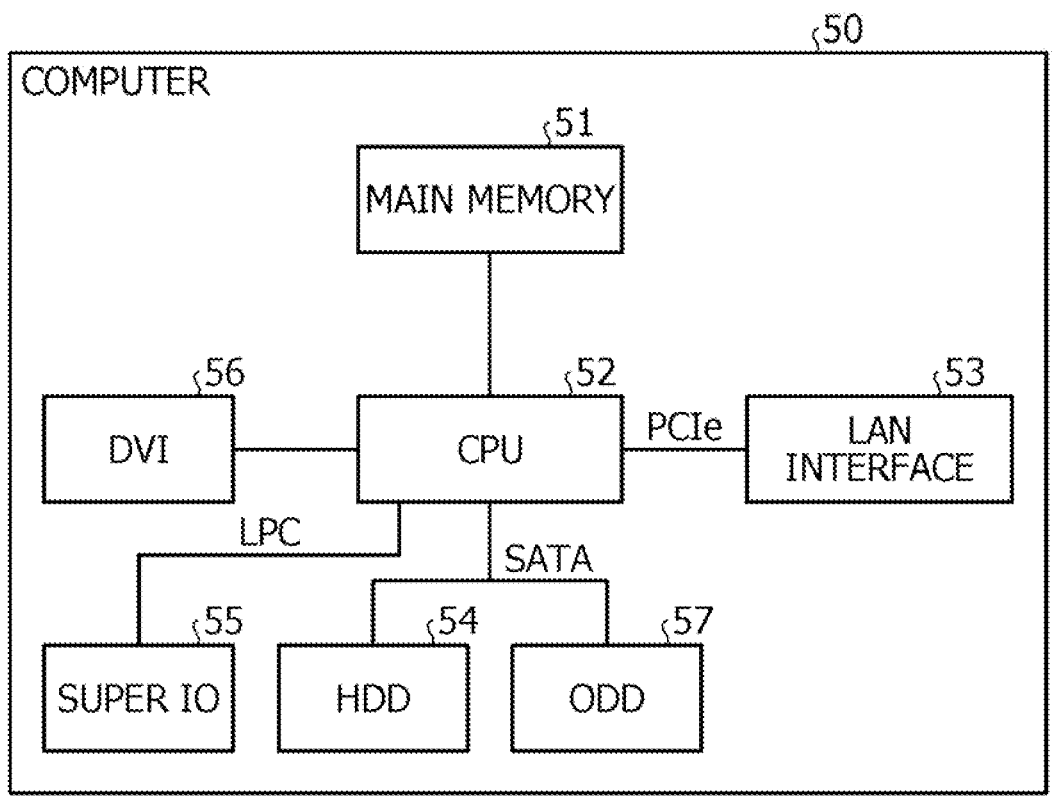
FIG. 22 is a diagram illustrating a hardware configuration of a computer that executes an execution program according to the first and second embodiments.

FIG. 22 is a diagram illustrating a hardware configuration of a computer that executes the execution program according to the first and second embodiment. As illustrated in FIG. 22, a computer 50 includes a main memory 51, a central processing unit (CPU) 52, a local area network (LAN) interface 53, and a hard disk drive (HDD) 54. Furthermore, the computer 50 includes a super input output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads and executes a program from the main memory 51. The CPU 52 includes a chipset having a memory controller.

The LAN interface 53 is an interface for connecting the computer 50 to another computer by way of a LAN. The HDD 54 is a disk device that stores a program and data, and the super IO 55 is an interface for connecting an input device such as a mouse and a keyboard. The DVI 56 is an interface that connects a liquid crystal display device, and the ODD 57 is a device that performs reading and writing on a digital versatile disk (DVD).

The LAN interface 53 is connected to the CPU 52 by peripheral component interconnect express (PCIe), and the HDD 54 and the ODD 57 are connected to the CPU 52 by serial advanced technology attachment (SATA). The super IO 55 is connected to the CPU 52 by low pin count (LPC).

Then, the execution program executed by the computer 50 is stored in a DVD that is an example of a recording medium that can be read by the computer 50, and is read from the DVD by the ODD 57 to be installed to the computer 50. Alternatively, the execution program is stored in a database or the like of another computer system connected via the LAN interface 53 and is read from the above database or the like to be installed to the computer 50. Then, the installed execution program is stored in the HDD 54, read to the main memory 51, and executed by the CPU 52.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a trading program for causing a computer to execute a process comprising:
    acquiring a number of sell orders for each of sell limits and a number of buy orders for each of buy limits;
    executing one of pairings of one of the sell orders and one of the buy orders in which one of the sell limits of the one of the sell orders is equal to or lower than one of the buy limits of the one of the buy orders, among the pairings of the sell orders and the buy orders, based on the acquired number of the sell orders for each of the sell limits and the acquired number of the buy orders for each of the buy limits; and
    resolving an execution price for each of executions, wherein
    the acquiring includes
        acquiring a number of sell orders for each of the sell limits and a number of buy orders for each of the buy limits for new orders, and the executing includes:
        merging a part of new sell orders higher than a present price and a part of new buy orders at the present price or lower with existing orders;
        determining whether or not there are existing buy orders equal to or higher than some of the sell limits of another part of the newsell orders at the present price or lower, and matching the another part of the newsell orders at the present price or lower and the existing buy orders when there are the existing buy orders;
        determining whether or not there are existing sell orders equal to or lower than some of the buy limits of another part of the new buy orders higher than the present price, and matching the another part of the new buy orders higher than the present price and the existing sell orders when there are the existing sell orders;
        matching a remaining part of the newsell orders and a remaining part of the new buy orders;
        totaling a number of matches between the another part of the newsell orders at the present price or lower and the existing buy orders, a number of matches between the another part of the new buy orders higher than the present price and the existing sell orders, and a number of matches between the remaining part of the newsell orders and the remaining part of the new buy orders to specify a number of the executions; and
        specifying and executing matching that consumes an order with a preferential price, based on the specified number of the executions.

2. The non-transitory computer-readable recording medium storing the trading program according to claim 1, wherein
    the acquiring includes acquiring from an order management device that manages orders using a balanced binary tree,
    the merging the part of the newsell orders higher than the present price and the part of the new buy orders at the present price or lower with the existing orders is performed by triggering the order management device,
    the determining whether or not there are the existing buy orders equal to or higher than the some of the sell limits of the another part of the newsell orders equal to or lower than the present price includes determining by triggering the order management device to perform searches for the existing buy orders equal to or higher than the some of the sell limits of the another part of the newsell orders for each of the newsell orders, and
    the determining whether or not there are the existing sell orders equal to or lower than the some of the buy limits of the another part of the new buy orders higher than the present price includes determining by triggering the order management device to perform searches for the existing sell orders equal to or lower than the some of the buy limits of the another part of the new buy orders for each of the new buy orders.

3. The non-transitory computer-readable recording medium storing the trading program according to claim 1, wherein the specifying includes specifying a maximum number of the executions, and the executing includes specifying and executing the matching that consumes the order with the preferential price, based on the specified maximum number of the executions.

4. A trading method comprising:
    acquiring, by a processor, a number of sell orders for each of sell limits and a number of buy orders for each of buy limits;
    executing, by the processor, one of pairings of one of the sell orders and one of the buy orders in which one of the sell limits of the one of the sell orders is equal to or lower than one of the buy limits of the one of the buy orders, among the pairings of the sell orders and the buy orders, based on the acquired number of the sell orders for each of the sell limits and the acquired number of the buy orders for each of the buy limits; and
    resolving an execution price for each of executions, wherein
    the acquiring, includes acquiring, by the processor, a number of sell orders for each of the sell limits and a number of buy orders for each of the buy limits for new orders, and the executing includes:

merging, by the processor, a part of new sell orders higher than a present price and a part of new buy orders at the present price or lower with existing orders;

determining, by the processor, whether or not there are existing buy orders equal to or higher than some of the sell limits of another part of the newsell orders at the present price or lower, and matching the another part of the newsell orders at the present price or lower and the existing buy orders when there are the existing buy orders;

determining, by the processor, whether or not there are existing sell orders equal to or lower than some of the buy limits of another part of the newbuy orders higher than the present price, and matching the another part of the newbuy orders higher than the present price and the existing sell orders when there are the existing sell orders;

matching, by the processor, a remaining part of the newsell orders and a remaining part of the new buy orders;

totaling, by the processor, a number of matches between the another part of the new sell orders at the present price or lower and the existing buy orders, a number of matches between the another part of the new buy orders higher than the present price and the existing sell orders, and a number of matches between the remaining part of the new sell orders and the remaining part of the newbuy orders to specify a number of the executions; and specifying and executing, by the processor, matching that consumes an order with a preferential price, based on the specified number of the executions.

5. The trading method according to claim 4, wherein the specifying includes specifying a maximum number of the executions, and the executing includes specifying and executing the matching that consumes the order with the preferential price, based on the specified maximum number of the executions.

6. An information processing device comprising:
a memory; and
a processor coupled to the memory and configured to:

acquire a number of sell orders for each of sell limits and a number of buy orders for each of buy limits;

execute one of pairings of one of the sell orders and one of the buy orders in which one of the sell limits of the one of the sell orders is equal to or lower than one of the buy limits of the one of the buy orders, among the pairings of the sell orders and the buy orders, based on the acquired number of the sell orders for each of the sell limits and the acquired number of the buy orders for each of the buy limits; and resolve an execution price for each of executions, wherein the processor acquires a number of sell orders for each of the sell limits and a number of buy orders for each of the buy limits for new orders, and merges a part of newsell orders higher than a present price and a part of newbuy orders at the present price or lower with existing orders;

determines whether or not there are existing buy orders equal to or higher than some of the sell limits of another part of the newsell orders at the present price or lower, and matching the another part of the new sell orders at the present price or lower and the existing buy orders when there are the existing buy orders;

determines whether or not there are existing sell orders equal to or lower than some of the buy limits of another part of the new buy orders higher than the present price, and matching the another part of the new buy orders higher than the present price and the existing sell orders when there are the existing sell orders;

matches a remaining part of the newsell orders and a remaining part of the new buy orders;

totals a number of matches between the another part of the newsell orders at the present price or lower and the existing buy orders, a number of matches between the another part of the new buy orders higher than the present price and the existing sell orders, and a number of matches between the remaining part of the newsell orders and the remaining part of the new buy orders to specify a number of the executions; and specifies and executing matching that consumes an order with a preferential price, based on the specified number of the executions.

7. The information processing device according to claim 6, wherein the processor specifies and executes the matching that consumes the order with the preferential price, based on the specified maximum number of the executions.

* * * * *